US007788684B2

(12) United States Patent
Petrovic et al.

(10) Patent No.: US 7,788,684 B2
(45) Date of Patent: Aug. 31, 2010

(54) MEDIA MONITORING, MANAGEMENT AND INFORMATION SYSTEM

(75) Inventors: Rade Petrovic, San Diego, CA (US); Babak Tehranchi, San Diego, CA (US); Kanaan Jemili, San Diego, CA (US); Joseph M. Winograd, San Diego, CA (US); Dean Angelico, Carlsbad, CA (US)

(73) Assignee: Verance Corporation, San Diego, CA (US)

( * ) Notice: Subject to any disclaimer, the term of this patent is extended or adjusted under 35 U.S.C. 154(b) by 2062 days.

(21) Appl. No.: 10/681,953

(22) Filed: Oct. 8, 2003

(65) Prior Publication Data

US 2004/0073916 A1    Apr. 15, 2004

Related U.S. Application Data

(60) Provisional application No. 60/418,597, filed on Oct. 15, 2002.

(51) Int. Cl.
*H04N 60/32* (2006.01)
*H04N 20/14* (2006.01)
*H04N 60/29* (2006.01)
*H04N 7/173* (2006.01)
*H04N 7/16* (2006.01)

(52) U.S. Cl. .................... 725/18; 725/22; 725/107; 725/136; 713/176

(58) Field of Classification Search .................. 725/9, 725/18, 22, 107, 136; 713/176
See application file for complete search history.

(56) References Cited

U.S. PATENT DOCUMENTS 3,842,196 A    10/1974    Loughlin
3,885,217 A    5/1975    Cintron
3,919,479 A    11/1975    Moon et al.
3,973,206 A    8/1976    Haselwood et al.
4,048,562 A    9/1977    Haselwood et al.
4,225,967 A    9/1980    Miwa et al.
4,230,990 A    10/1980    Lert, Jr. et al.
4,425,578 A    1/1984    Haselwood et al.

(Continued)

FOREIGN PATENT DOCUMENTS

JP    2001-312570    11/2001

(Continued)

OTHER PUBLICATIONS

Mason, A.J., et al., "User Requirements for Watermarking in Broadcast Applications", IEEE Conference Publication, International Broadcasting Convention (IBC 2000), Amsterdam, Sep. 8-12, 2000.

(Continued)

*Primary Examiner*—Joseph G Ustaris
(74) *Attorney, Agent, or Firm*—Foley & Lardner LLP

(57) ABSTRACT

Systems and methods are provided for monitoring transmissions of media content (such as audio and audiovisual content) in order to obtain independent and objective data regarding the use of specific media content recordings or works within the transmissions. Processing and reporting of such data is provided in various ways to serve a variety of business needs. Methods for employing content identification technology to efficiently and automatically obtain reliable, accurate, and precise monitoring data are also disclosed. Various information products and services based on such monitoring systems are proposed.

55 Claims, 9 Drawing Sheets

U.S. PATENT DOCUMENTS

| | | | |
|---|---|---|---|
| 4,454,610 A | 6/1984 | Sziklai | |
| 4,547,804 A | 10/1985 | Greenberg | |
| 4,639,779 A | 1/1987 | Greenberg | |
| 4,677,466 A | 6/1987 | Lert, Jr. et al. | |
| 4,686,707 A | 8/1987 | Iwasaki et al. | |
| 4,697,209 A | 9/1987 | Kiewit et al. | |
| 4,703,476 A | 10/1987 | Howard | |
| 4,723,302 A | 2/1988 | Fulmer et al. | |
| 4,739,398 A | 4/1988 | Thomas et al. | |
| 4,750,173 A | 6/1988 | Bluthgen | |
| 4,764,808 A | 8/1988 | Solar | |
| 4,805,020 A | 2/1989 | Greenberg | |
| 4,807,031 A | 2/1989 | Broughton et al. | |
| 4,843,562 A | 6/1989 | Kenyon et al. | |
| 4,876,736 A | 10/1989 | Kiewit | |
| 4,930,011 A | 5/1990 | Kiewit | |
| 4,931,871 A | 6/1990 | Kramer | |
| 4,943,963 A | 7/1990 | Waechter et al. | |
| 4,945,412 A | 7/1990 | Kramer | |
| 4,967,273 A | 10/1990 | Greenberg | |
| 4,969,041 A | 11/1990 | O'Grady et al. | |
| 4,972,471 A | 11/1990 | Gross et al. | |
| 4,972,503 A | 11/1990 | Zurlinden | |
| 4,979,210 A | 12/1990 | Nagata et al. | |
| 5,113,437 A * | 5/1992 | Best et al. | 380/253 |
| 5,200,822 A | 4/1993 | Bronfin et al. | |
| 5,210,820 A | 5/1993 | Kenyon | |
| 5,210,831 A | 5/1993 | Emma et al. | |
| 5,294,982 A | 3/1994 | Salomon et al. | |
| 5,319,735 A | 6/1994 | Preuss et al. | |
| 5,351,304 A | 9/1994 | Yamamoto | |
| 5,379,345 A | 1/1995 | Greenberg | |
| 5,404,160 A | 4/1995 | Schober et al. | |
| 5,404,377 A | 4/1995 | Moses | |
| 5,408,258 A | 4/1995 | Kolessar | |
| 5,424,785 A | 6/1995 | Orphan | |
| 5,425,100 A | 6/1995 | Thomas et al. | |
| 5,436,653 A | 7/1995 | Ellis et al. | |
| 5,450,490 A | 9/1995 | Jensen et al. | |
| 5,481,294 A | 1/1996 | Thomas et al. | |
| 5,504,518 A | 4/1996 | Ellis et al. | |
| 5,508,754 A | 4/1996 | Orphan | |
| 5,526,427 A | 6/1996 | Thomas et al. | |
| 5,537,484 A | 7/1996 | Kobayashi | |
| 5,579,124 A | 11/1996 | Aijala et al. | |
| 5,581,658 A | 12/1996 | O'Hagan et al. | |
| 5,581,800 A | 12/1996 | Fardeau et al. | |
| 5,613,004 A | 3/1997 | Cooperman et al. | |
| 5,636,292 A | 6/1997 | Rhoads | |
| 5,664,018 A | 9/1997 | Leighton | |
| 5,761,606 A | 6/1998 | Wolzien | |
| 5,778,108 A | 7/1998 | Coleman, Jr. | |
| 5,819,289 A | 10/1998 | Sanford, II et al. | |
| 5,828,325 A | 10/1998 | Wolosewicz et al. | |
| 5,841,978 A | 11/1998 | Rhoads | |
| 5,850,481 A | 12/1998 | Rhoads | |
| 5,887,243 A | 3/1999 | Harvey et al. | |
| 5,889,868 A | 3/1999 | Moskowitz et al. | |
| 5,892,900 A | 4/1999 | Ginter et al. | |
| 5,905,800 A | 5/1999 | Moskowitz et al. | |
| 5,930,369 A | 7/1999 | Cox et al. | |
| 5,937,000 A | 8/1999 | Lee et al. | |
| 5,940,135 A | 8/1999 | Petrovic et al. | |
| 5,960,081 A | 9/1999 | Vynne et al. | |
| 5,986,692 A | 11/1999 | Logan et al. | |
| 6,021,432 A * | 2/2000 | Sizer et al. | 709/217 |
| 6,035,171 A | 3/2000 | Takaya et al. | |
| 6,035,177 A | 3/2000 | Moses et al. | |
| 6,044,156 A | 3/2000 | Honsinger et al. | |
| 6,067,440 A * | 5/2000 | Diefes | 725/27 |
| 6,094,228 A | 7/2000 | Ciardullo et al. | |
| 6,101,310 A | 8/2000 | Terada et al. | |
| 6,145,081 A | 11/2000 | Winograd et al. | |
| 6,173,271 B1 | 1/2001 | Goodman et al. | |
| 6,209,092 B1 | 3/2001 | Linnartz | |
| 6,229,572 B1 | 5/2001 | Ciardullo et al. | |
| 6,233,347 B1 | 5/2001 | Chen et al. | |
| 6,249,870 B1 | 6/2001 | Kobayashi et al. | |
| 6,252,972 B1 | 6/2001 | Linnartz | |
| 6,253,189 B1 | 6/2001 | Feezell et al. | |
| 6,278,792 B1 | 8/2001 | Cox et al. | |
| 6,285,774 B1 | 9/2001 | Schumann et al. | |
| 6,330,672 B1 | 12/2001 | Shur | |
| 6,332,031 B1 | 12/2001 | Rhoads et al. | |
| 6,353,672 B1 | 3/2002 | Rhoads | |
| 6,373,974 B2 | 4/2002 | Zeng | |
| 6,388,712 B1 | 5/2002 | Shinohara et al. | |
| 6,400,827 B1 | 6/2002 | Rhoads | |
| 6,404,781 B1 | 6/2002 | Kawamae et al. | |
| 6,404,898 B1 | 6/2002 | Rhoads | |
| 6,415,040 B1 | 7/2002 | Linnartz et al. | |
| 6,430,301 B1 | 8/2002 | Petrovic | |
| 6,430,302 B2 | 8/2002 | Rhoads | |
| 6,449,367 B2 | 9/2002 | Van Wie et al. | |
| 6,473,560 B1 | 10/2002 | Linnartz et al. | |
| 6,477,431 B1 | 11/2002 | Kalker et al. | |
| 6,487,301 B1 | 11/2002 | Zhao | |
| 6,505,160 B1 | 1/2003 | Levy et al. | |
| 6,510,233 B1 | 1/2003 | Nakano | |
| 6,510,234 B1 | 1/2003 | Cox et al. | |
| 6,512,837 B1 | 1/2003 | Ahmed | |
| 6,529,506 B1 | 3/2003 | Yamamoto et al. | |
| 6,530,021 B1 | 3/2003 | Epstein et al. | |
| 6,556,688 B1 | 4/2003 | Ratnakar | |
| 6,570,996 B1 | 5/2003 | Linnartz | |
| 6,574,350 B1 | 6/2003 | Rhoads et al. | |
| 6,577,744 B1 | 6/2003 | Braudaway et al. | |
| 6,590,997 B2 | 7/2003 | Rhoads | |
| 6,591,365 B1 | 7/2003 | Cookson | |
| 6,598,162 B1 | 7/2003 | Moskowitz | |
| 6,614,914 B1 | 9/2003 | Rhoads et al. | |
| 6,618,484 B1 | 9/2003 | Van Wie et al. | |
| 6,633,653 B1 | 10/2003 | Hobson et al. | |
| 6,636,615 B1 | 10/2003 | Rhoads et al. | |
| 6,647,128 B1 | 11/2003 | Rhoads | |
| 6,647,129 B2 | 11/2003 | Rhoads | |
| 6,654,501 B1 | 11/2003 | Acharya et al. | |
| 6,668,068 B2 | 12/2003 | Hashimoto | |
| 6,671,388 B1 | 12/2003 | Op De Beeck et al. | |
| 6,674,861 B1 | 1/2004 | Xu et al. | |
| 6,675,146 B2 | 1/2004 | Rhoads | |
| 6,678,389 B1 | 1/2004 | Sun et al. | |
| 6,681,029 B1 | 1/2004 | Rhoads | |
| 6,683,958 B2 | 1/2004 | Petrovic | |
| 6,700,990 B1 | 3/2004 | Rhoads | |
| 6,707,926 B1 | 3/2004 | Macy et al. | |
| 6,728,390 B2 | 4/2004 | Rhoads et al. | |
| 6,738,495 B2 | 5/2004 | Rhoads et al. | |
| 6,744,906 B2 | 6/2004 | Rhoads et al. | |
| 6,748,360 B2 | 6/2004 | Pitman et al. | |
| 6,751,337 B2 | 6/2004 | Tewfik et al. | |
| 6,757,908 B1 * | 6/2004 | Vogel | 725/107 |
| 6,771,797 B2 | 8/2004 | Ahmed | |
| 6,785,399 B2 | 8/2004 | Fujihara | |
| 6,785,815 B1 | 8/2004 | Serret-Avila et al. | |
| 6,792,542 B1 | 9/2004 | Lee et al. | |
| 6,829,368 B2 | 12/2004 | Meyer et al. | |
| 6,834,344 B1 | 12/2004 | Aggarwal et al. | |
| 6,850,626 B2 | 2/2005 | Rhoads et al. | |
| 6,856,693 B2 | 2/2005 | Miller | |
| 6,880,082 B2 | 4/2005 | Ohta | |
| 6,888,943 B1 | 5/2005 | Lam et al. | |
| 6,891,958 B2 | 5/2005 | Kirovski et al. | |
| 6,915,002 B2 | 7/2005 | Gustafson | |

| | | | |
|---|---|---|---|
| 6,931,536 | B2 | 8/2005 | Hollar |
| 6,952,774 | B1 | 10/2005 | Kirovski et al. |
| 6,954,541 | B2 | 10/2005 | Fan et al. |
| 6,993,154 | B2 | 1/2006 | Brunk |
| 7,007,166 | B1 | 2/2006 | Moskowitz et al. |
| 7,020,304 | B2 | 3/2006 | Alattar et al. |
| 7,024,018 | B2 | 4/2006 | Petrovic |
| 7,043,049 | B2 | 5/2006 | Kuzma |
| 7,043,536 | B1 * | 5/2006 | Philyaw et al. .............. 709/219 |
| 7,046,808 | B1 | 5/2006 | Metois et al. |
| 7,054,461 | B2 | 5/2006 | Zeller et al. |
| 7,054,462 | B2 | 5/2006 | Rhoads et al. |
| 7,058,815 | B2 | 6/2006 | Morin |
| 7,171,020 | B2 | 1/2007 | Rhoads et al. |
| 7,197,368 | B2 | 3/2007 | Kirovski et al. |
| 7,206,649 | B2 | 4/2007 | Kirovski et al. |
| 7,231,061 | B2 | 6/2007 | Bradley |
| 7,289,643 | B2 | 10/2007 | Brunk et al. |
| 7,298,865 | B2 | 11/2007 | Lubin et al. |
| 7,334,247 | B1 * | 2/2008 | Finseth et al. ................. 725/21 |
| 2001/0022786 | A1 * | 9/2001 | King et al. .................. 370/412 |
| 2001/0044899 | A1 * | 11/2001 | Levy ......................... 713/176 |
| 2002/0044659 | A1 | 4/2002 | Ohta |
| 2002/0052885 | A1 | 5/2002 | Levy |
| 2002/0053026 | A1 | 5/2002 | Hashimoto |
| 2002/0080964 | A1 | 6/2002 | Stone et al. |
| 2002/0080976 | A1 | 6/2002 | Schreer |
| 2002/0120849 | A1 | 8/2002 | McKinley et al. |
| 2002/0120854 | A1 | 8/2002 | Levine et al. |
| 2002/0126872 | A1 | 9/2002 | Brunk et al. |
| 2002/0138734 | A1 | 9/2002 | David et al. |
| 2002/0154144 | A1 | 10/2002 | Lofgren et al. |
| 2002/0178368 | A1 | 11/2002 | Yin et al. |
| 2003/0009671 | A1 | 1/2003 | Yacobi et al. |
| 2003/0012403 | A1 | 1/2003 | Rhoads et al. |
| 2003/0021439 | A1 | 1/2003 | Lubin et al. |
| 2003/0021441 | A1 | 1/2003 | Levy et al. |
| 2003/0028796 | A1 | 2/2003 | Roberts et al. |
| 2003/0112974 | A1 | 6/2003 | Levy |
| 2003/0115504 | A1 | 6/2003 | Holliman et al. |
| 2003/0131350 | A1 | 7/2003 | Peiffer et al. |
| 2003/0188166 | A1 | 10/2003 | Pelly et al. |
| 2003/0190055 | A1 | 10/2003 | Kalker et al. |
| 2003/0200438 | A1 | 10/2003 | Kirovski et al. |
| 2004/0008864 | A1 | 1/2004 | Watson et al. |
| 2004/0009763 | A1 | 1/2004 | Stone et al. |
| 2004/0010692 | A1 | 1/2004 | Watson |
| 2004/0042635 | A1 | 3/2004 | Epstein et al. |
| 2004/0073916 | A1 | 4/2004 | Petrovic et al. |
| 2004/0078575 | A1 | 4/2004 | Morten et al. |
| 2004/0091111 | A1 | 5/2004 | Levy et al. |
| 2004/0098593 | A1 | 5/2004 | Muratani |
| 2004/0101160 | A1 | 5/2004 | Kunisa |
| 2004/0103293 | A1 | 5/2004 | Ryan |
| 2004/0133794 | A1 | 7/2004 | Kocher et al. |
| 2004/0204943 | A1 | 10/2004 | Kirovski et al. |
| 2005/0251683 | A1 | 11/2005 | Levy et al. |
| 2006/0005029 | A1 | 1/2006 | Petrovic et al. |
| 2006/0227968 | A1 | 10/2006 | Chen et al. |

FOREIGN PATENT DOCUMENTS

| | | |
|---|---|---|
| WO | WO 00/13136 | 3/2000 |
| WO | WO 01/55889 | 8/2001 |

OTHER PUBLICATIONS

Verance Corporation, "Confirmedia", PowerPoint presentation made to National Association of Broadcasters; Apr. 24, 2001 (40 pages).
Barreto, et al. "Toward Secure Public-Key Blockwise Fragile Authentication Watermarking", IEEE Proceedings—Vision, Image, and Signal Processing—Apr. 2002, vol. 149, Issue 2, p. 57-62.
Caronni, G. "Assuring Ownership Rights for Digital Images," Proceedings of 'reliable IT systems' VIS 95, H.H. Bruggermann and W. Gerhardt-Hackl (Ed.), Vieweg Publishing Company, Germany, 1995.
Chen, B. et al. "Quantization Index Modulation: A Class of Provably Good Methods for Digital Watermarking and Information Embedding," IEEE Transactions on Information Theory, Vo. 47, No. 4, May 2001, p. 1423-1443.
International Search Report for PCT Application No. PCT/US03/31816 dated May 19, 2004.
International Search Report for PCT Application No. PCT/US07/16812 dated Sep. 26, 2008.
Cox, I.J, et al. "Some General Methods for Tampering with Watermarks," IEEE Journal on Selected Areas in Communications, vol. 16, No. 4, May 1998.
Furon, T., et al. "An Asymmetric Watermarking Method," IEEE Trans. Signal Processing, vol. 51, No. 4 Apr. 2003, p. 981-995.
Kim, T.Y., et al. "An Asymmetric Watermarking System with Many Embedding Watermarks Corresponding to One Detection Watermark", IEEE Signal Processing Letters, vol. 11, No. 3, Mar. 2004, p. 375-377.
Kirovski, D., et al. "Multimedia Content Screening using a Dual Watermarking and Fingerprinting System," Tech. Rep. MSR-TR-2001-57, Microsoft Research, Jun. 2001.
Kirovski, D., et al. "The Blind Pattern Matching Attack on Watermark Systems," IEEE Trans, Signal Processing, Apr. 2003.
Kirovski, D., et al. "Randomizing the Replacement Attack," ICASSP 2004, p. 381-384.
Kirovski, et al. "Multimedia Content Screening Using a Dual Watermarking and Fingerprinting System", Proceedings of the Tenth ACM International Conference, 2002, p. 372-381.
Kutter, M., et al. "The Watermark Copy Attack," Proc. of the SPIE: Security and Watermarking of Multimedia Content II, vol. 3971, Jan. 2000.
Lin et al. "Detection of Image Alterations Using Semi-Fragile Watermarks", Proceedings of the SPIE International Conference on Security and Watermarking of Multimedia Contents II, vol. 3971, Jan. 2000.
Lu, Chun-Shien, et al. "Oblivious Cocktail Watermarking By Sparse Code Shrinkage: A Regional and Global-Based Scheme," ICIP, 2000, (vol. III: 13-16).
Mason, A. J., et al. "User Rqquirements for Watermarking in Broadcast Applications," IEEE Conference Publication, International Broadcasting Convention (IBC 2000), Amsterdam, Sep. 8-12, 2000.
Mintzer, et al. "An Invisible Watermarking Technique for Image Verification," 1997, pp. 680-683.
Mintzer, et al. "If One Watermark if Good, Are More Better?" Acoustics, Speech, and Signal Processing, 1999. ICASSP'99., Publication Date Mar. 15-19, vol. 4, p. 2067-2069.
Mobasseri, B.G., et al. "Content Authentication and Tamper Detection in Digital Video", Image Processing, 2000. Proceedings, 2000 International Conference, vol. 1, 2000, p. 458-461.
Moulin, P., et al. "Detection—Theoretic Analysis of Desynchronization Attacks in Watermarking," Tech. Rep. MSR-TR-2002-24, Microsoft Research (Mar. 2002).
Park, et al. "Robust and Fragile Watermarking Techniques for Documents Using Bi-directional Diagonal Profiles", Information and Communications Security: Third International Conference, ICICS 2001, Xian, China, Nov. 13-16, p. 483-494.
Petitcolas, F.A.P., et al. "Attacks on Copyright Marking Systems," Second Workship on Information Hiding, vol. 1525 of Lecture Notes in Computer Science. p. 218-238, Apr. 1998.
Steinebach, M., et al. "StirMark Benchmark: Audio Watermarking Attacks," Int. Conference on Information Technology: Coding and Computing (ITCC 2001), Apr. 2-4, Las Vegas, Nevada, p. 49-54.
T. Kalker, "A Security Risk for Publicly Available Watermark Detectors," Proc. Benelux Info. Theroy Symp., Veldhoven, The Netherlands, May 1998.
Tanaka, K, et al. "Secret Transmission Method of Character Data in Motion Picture Communication," SPIE vol. 1605, Visual Communications and Image Processing '91, Visual Communications, p. 646-649, 1991.
Tsai, et al. "Wavelet packet and Adaptive Spatial Transformation of Watermark for Digital Image. Authentication", IEEE, Image Processing, 2000. Proceedings 2000 International Conference, Publication Date 2000, vol. 1, pp. 450-453.

Verance Corporation, "Confirmedia", Powerpoint Presentation Made to National Associate of Broadcasters; Apr. 24, 2001.

Yeung, et al. "An Invisible Watermarking Technique for Image Verification", 1997, pp. 680-683.

* cited by examiner

MEDIA MONITORING, MANAGEMENT AND INFORMATION SYSTEM

BACKGROUND OF THE INVENTION

This application claims priority from U.S. provisional application No. 60/418,597 filed on Oct. 15, 2002, the entire contents of which is hereby incorporated by reference.

The present invention relates generally to systems for monitoring transmissions of media content (such as audio and audiovisual content) in order to obtain independent and objective data regarding the use of specific media content recordings or works within said transmissions. The invention also relates to the processing and reporting of such data in various ways to serve a variety of business needs. More particularly, the invention relates to methods for employing content identification technology to efficiently and automatically obtain reliable, accurate, and precise monitoring data. The invention further relates to methods for producing information products and services based on such monitoring systems.

It is often desired to perform monitoring to obtain information regarding the use of (or the failure to use) particular media content (such as live or prerecorded music, radio and television programming, and advertising) within various types of transmissions (such as radio and television broadcasts, Internet downloads and streams, and public address systems). The commercial reasons for desiring such information are many and varied, including: providing proof-of-performance for paid advertisements, determining compliance with syndication licenses, identifying uses of copyrighted sound recordings within other programming, administration of the performing rights associated with copyrighted musical compositions, determining the audience size of broadcasts, identifying retransmissions of network or syndicated content, identifying corrupted or partial transmission of advertisements or programming, identifying unauthorized transmissions of copyrighted works, and identifying uses of promotional content and public service announcements.

In such monitoring, it may be desirable to obtain a variety of pieces of information regarding the use of the media content, including identification of the exact time, date, location of reception, duration, quality, origin, and method of transmission of the content.

In addition, it is advantageous to perform such monitoring automatically without significant intervention from human operators.

There are a number of prior art broadcast monitoring systems, which may generally be classified in two groups: passive and active systems. In passive systems, where no additional signals are added to the broadcast programs, measurements of individualizing innate characteristics of the broadcast signals are used to identify a particular segment. These characteristics are sometimes referred to as "fingerprints" in analogy with human fingerprints that are used to identify individuals. Some examples of fingerprints include spectral variations of the broadcast signals, statistical moments, predefined patterns, such as key words, or predefined signal shapes, etc. Descriptions of passive monitoring and identification systems may be found in U.S. Pat. Nos. 3,919,479; 4,230,990; 4,677,466; 4,697,209; 4,843,562; 5,210,831; 5,436,653; 5,481,294; 5,504,518 and 5,581,658. Such fingerprinting techniques have the disadvantage of requiring complicated search algorithms for comparing the fingerprints that are extracted from broadcast segments to a large database of previously stored fingerprints. In addition, they require a sizeable database of stored fingerprints which only grows in size and complexity as the monitoring service is expanded to include newly produced content.

Active systems modify broadcast signals by introducing (e.g., via "embedding") additional data-carrying signals into the broadcast in a way that does not interfere with normal viewing and/or listening of the broadcast content. However, such additional signals can be detected and decoded (i.e. "extracted") by an appropriately designed device. Active systems may be classified into two categories, usually known as 'out-of-band' and 'in-band' systems.

In out-of-band systems, the additional information does not reside within the frequency, time or spatial content of the broadcast signal. For example, some video monitoring signals use the vertical blanking intervals of a video signal to insert identification codes. Other systems use a carrier signal outside the frequency spectrum of audio signals for carrying the identification information. Examples of such systems are described in U.S. Pat. Nos. 4,686,707; 4,967,273 and 5,425,100. The primary disadvantage of such systems is their vulnerability to format conversion and filtering of the broadcast signals during distribution of the content. For example, data inserted in the vertical blanking intervals (VBI) of an NTSC format video signal may be lost if the video signal is converted from NTSC to MPEG format. Likewise, additional data signals inserted in the audio spectrum outside the range of human hearing may be removed by bandpass filtering of the encoded audio signals.

In contrast, the additional information in an 'in-band' system is inserted within the visible portion of video and/or audible portion of audio content, which is more likely to be preserved during any further duplication, distribution, processing, or broadcast of the content. This type of embedding of auxiliary signals into humanly-perceivable media content is often called "watermarking." Some examples of such watermarking systems include embedding auxiliary information into television broadcasts by changing the luminescence of adjacent horizontal lines of video in opposite directions. In a typical viewing situation, the human visual system would 'average' adjacent horizontal lines and not notice the deviations from the original. Other systems modulate the auxiliary identification information with an independently generated carrier signal using well-known modulation techniques such as AM, FM, PM or spread-spectrum, and then introduce the modulated signal as low level noise into the broadcast segment. Examples of such systems can be found in U.S. Pat. Nos. 3,842,196; 3,885,217; 4,686,707; 4,945,412; 4,969,041; 5,200,822; 5,379,345; 5,404,377; 5,404,160; 5,408,258; 5,425,100; 5,450,490; 5,579,124; 5,581,800 and 6,404,898. These systems can generally be made resilient to a wider variety of transmission channel impairments than their out-of-band counterparts. Extraction of reliable identification information under more severe channel impairments, however, usually necessitates increasing the strength of the embedded watermark. This, in turn, compromises visual and/or audio quality of the broadcast segment. In addition, these systems usually fail to withstand combinations of such unintentional impairments or intentional attacks. A short list of typical transmission channel impairments which may be present in an audio-visual transmission channel include: lossy compression (e.g. MPEG), linear time compression/expansion, pitch-invariant time compression/expansion, Gaussian and non-Gaussian noise, equalization, voice over, change in resolution, change in bit depth, filtering, digital-to-analog and analog-to-digital conversions, interpolation, cropping, rotation, geometrical distortions, dynamic range compression, etc.

While a number of broadcast monitoring systems that have been deployed commercially employ image or video-based watermark technology, there are certain advantages in using audio watermarks for monitoring. For example, it may be less computationally-expensive to process audio information because of its relatively slow data rate (compared to typical video data rates). Of course, the processing requirements strongly depend on the particular technology in use. It is also possible to monitor both audio and audiovisual content through the use of audio watermarking, whereas image or video-based watermarking fails to address the monitoring of exclusively audio content.

SUMMARY OF THE INVENTION

It is a principal object of this invention to provide reliable and comprehensive monitoring methods that overcome various deficiencies of the prior art systems. It is another object of the present invention to provide improved monitoring data through the use of redundant receivers and combined analysis of multiple copies of the same transmitted content. It is also an object of this invention to improve the accuracy or effectiveness of monitoring by measuring the quality of the received transmission or the transmission channel by measuring received transmission channel characteristics such as Signal-to-Noise-Ratio (SNR) or dropped packet rate. It is another object of this invention to differentiate between multiple points of origin of a composite transmission, such as the local, regional and national broadcast segments of a given networked television broadcast or an interstitially inserted advertisement in an Internet stream. It is a further object of the present invention to monitor the use of content in the presence of multiple transmission channel impairments. It should be noted that the term "transmission" as used herein will be understood to encompass, but not be limited to, broadcast programming, including satellite, network and cable television and radio programs, Internet broadcast programs, or any other type of program that is transmitted for reception by an audience. All or parts of such programming segments may reside on tangible storage media such as optical, magnetic, and electronic storage media for the purposes of storage, playback or distribution.

In accordance with the invention, a method is provided for monitoring broadcast multimedia content. Multimedia source content is received, and identification information related to the source content is generated. An audio component of the multimedia source content is imperceptibly and repeatedly embedded with the identification information. A detectability metric is produced by assessing the success of the embedding. The detectability metric is transferred to a central repository together with the identification information. The embedded multimedia content is transmitted through one or more broadcast networks, and received at a receiver. The received multimedia content is processed to extract identification information related to the multimedia content. It is noted that as used herein, the term "imperceptibly" includes "substantially imperceptibly", as it is conceivable that a person with a trained ear or an unusually acute aural sense may be able to perceive some distinction between the audio component prior to and after the identification information is embedded therein.

In an illustrated embodiment, extraction of embedded information is conducted in the presence of multiple transmission channel impairments. The embedding can be repeated in either or both of the temporal domain and frequency domains. Where the repetition is done in the frequency domain, it can occur at different frequencies.

Extraction of multiple copies of embedded information can be used to improve the reliability of multimedia monitoring. For example, extraction of multiple copies of embedded information can be used in accordance with the invention to estimate the duration of multimedia content embedded with identification information.

In one disclosed embodiment, the multiple copies are extracted from the multimedia content received over a single transmission channel. Alternatively, the multiple copies can be extracted from the multimedia content received from a plurality of transmission channels. The multiple copies can, for example, be extracted using a redundant network of receivers. The redundant receivers can be deployed in separate geographical locations.

At least one transmission channel for the embedded multimedia content can be a terrestrial broadcast channel. Alternatively, at least one transmission channel can be an Internet broadcast channel.

The spacing of the extracted copies of embedded information can be used to estimate the boundaries of back-to-back encoded multimedia clips. Moreover, the effectiveness of monitoring can be enhanced by measuring received transmission channel characteristics such as Signal-to-Noise-Ratio (SNR) or dropped packet rate. This technique can provide a measure of the quality of at least one of a received transmission or a transmission channel.

The detectability metric can be used at the monitoring sites to improve the reliability of detection reports. Further, the detectability metric and measured transmission channel characteristics (such as Signal-to-Noise-Ratio (SNR) or dropped packet rate) can be used at the monitoring sites to improve the reliability of multimedia monitoring. It is also disclosed that the identification information may be re-embedded with a modified embedding strength based on the detectability metric.

The type and extent of impairments present in the transmission channel can be identified based on the quality of extracted information from the embedded multimedia content.

The present disclosure also teaches that multiple points of origin of a composite transmission, such as the local, regional and national broadcast segments of a given networked television broadcast or an interstitially inserted advertisement in an Internet stream, are differentiated.

Prior to the transmission of multimedia content, the multimedia content can be examined for the presence of a valid watermark. For example, the validity of an embedded watermark can be ascertained by verifying the embedded identification information against corresponding information residing in a database.

A system is also disclosed for monitoring broadcast multimedia content. Receiving means are provided for receiving multimedia source content. Identification information generating means are used to generate identification information related to the source content. Embedding means imperceptibly and repeatedly embed the audio component of the multimedia source content with the identification information. Watermark assessment means produce a detectability metric by assessing the success of the embedding. Transfer means transfer the delectability metric together with the identification information to a central repository. Transmission means transmit the embedded multimedia content through one or more broadcast networks. Reception means receive the broadcast multimedia content. Processing means process the received multimedia content to extract identification information related to the multimedia content.

These and additional features and advantages of the present invention, such as its novel system architecture, set of services offered, system control and maintenance features, which result in exceptional performance characteristics, will become more readily clear from the following detailed description of the media monitoring, management and information system, together with the accompanying drawings.

DETAILED DESCRIPTION OF THE INVENTION

Figure 1:
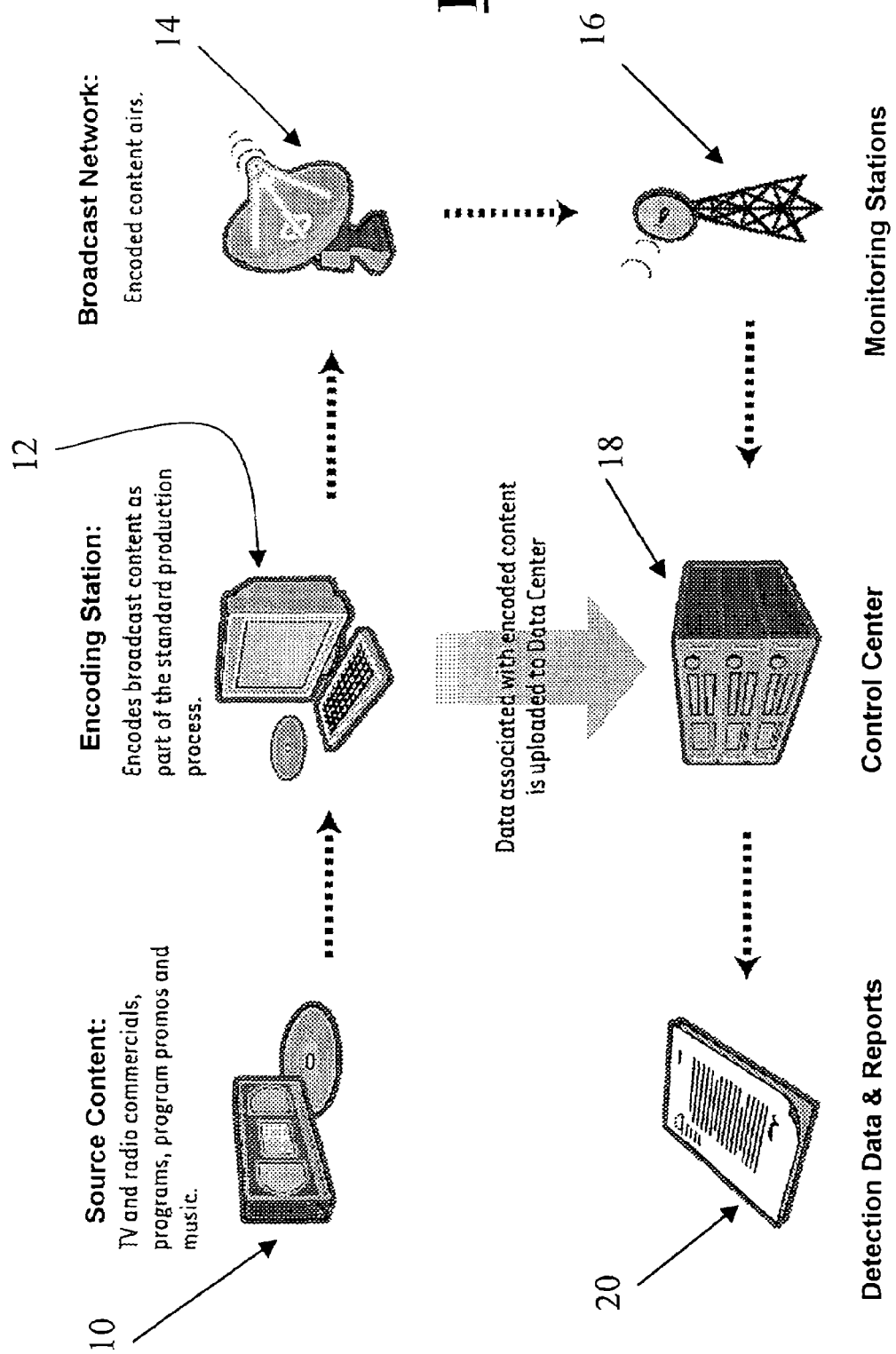
FIG. 1 illustrates a general monitoring network connectivity framework.

FIG. 1 is a high-level diagram of a monitoring system for detecting encoded information carried in a data signal. The source content 10 may comprise, for example, TV and radio commercials, programs, movie and program promos, music which is produced for broadcast, etc. All or parts of such source content 10 may reside on storage devices such as magnetic tapes, hard drives, optical storage or electronic memory devices. Alternatively, the source content 10 may be the soundtrack of a motion picture that is stored on the same medium or separate from the motion picture, e.g., as a digital or analog signal using any of a variety of well-known optical or magnetic techniques. In such cases, means must be provided to extract the associated audio in a computer-readable form for subsequent watermark embedding. It is further possible to directly access the audio signal from the production source without the need for intermediate storage. Such scenarios include direct (acoustical) coupling from the sound source, such as in live musical concerts or theatrical events, or during the studio production via digital and/or streaming networks and apparatus. Delivery means for such source content 10 also includes, but is not limited to, telephone lines, high-speed and/or wireless networks or a simple physical storage medium, as depicted in FIG. 1.

The source signal is digitized, if necessary, and sent to an encoding station 12 for embedding. In FIG. 1, this encoding station 12 is depicted to contain a Personal Computer (PC) as its processing unit. However, the PC may be readily replaced by any other processor capable of carrying out complex mathematical operations. Examples of such processors include, but are not limited to, the following: digital signal processors (DSP's), electronic circuits containing ASIC and FPGA devices, laptop and handheld electronic devices such as Personal Digital Assistants (PDA's) and mobile phones. Clearly, for the purposes of embedding watermarks into source content 10, a software solution may be more economically feasible, but it may be necessary to utilize a hardware implementation in, for example, time-critical audio-visual applications where synchronization between audio and video is required. It is further possible to place an embedding engine directly inside of a sound capturing device such as a movie camera, audio recording device and/or studio sound equipment, thus eliminating the need for a PC embedding device. In such cases, hardware or firmware modifications to the conventional sound capture/processing apparatus will be necessary.

The particular embedding techniques used in the monitoring system can be described under the general terminologies "Feature Modulation" and "Replica Modulation." These techniques, which are one of the differentiating factors of the present invention, transform part of the source signal, i.e. the replica or the feature, into a carrier of multi-bit auxiliary information that is subsequently added to the broadcast signal using psycho-acoustical masking considerations. The source signal embedded this way does not contain audible artifacts that can be discerned by ordinary or even highly trained human listeners; yet, the embedded information can be successfully extracted with accuracy rates of close to 100%, even in the presence of extreme intentional and unintentional transmission channel impairments and attacks. Using these algorithms, watermarks are inserted simultaneously and redundantly in separate frequency bands in order to withstand different types of distortion, such as noise addition, time scaling, reverberation etc. Because these watermarks reside in separate frequency bands, their audible artifacts are not cumulative; i.e. if the watermark in each band is transparent to the listener, then combining these bands together will not produce audible artifacts. This feat is accomplished through numerous subjective tests and is consistent with the well-known feature of the human auditory system in which different spectral bands are detected with different receptors (hair cells inside cochlea). The exceptional robustness of the watermark is further complimented by several levels of error correction techniques. The details of the embedding algorithms are disclosed in commonly owned U.S. Pat. Nos. 5,940,135; 6,175,627; and 6,427,012. Another feature of the embedding technique in the system of the present invention is its security against intentional attacks that attempt to remove or obliterate the embedded watermark; the detailed disclosure of this feature is given in commonly owned US Pat. No. 6,145,081.

During the embedding process, a multi-bit ID field is encoded in the source content 10 and, as shown in FIG. 1, the 'metadata' associated with the encoded content is transferred to the Control Center 18 upon each successful embedding. This metadata may comprise a full description of the owner and content, date and time stamps, etc. that are used to facilitate the identification and tracking of broadcast signals once the embedded content is received by the monitoring stations 16. It is also possible for the embedded watermark to carry all the pertinent information required for tracking and identification of the broadcast segment. However this would require a large watermark payload capacity which necessitates either longer embedded segments or a lower expected detection reliability. For example, a 3-minute music track may be a suitable candidate for this type of embedding but a 20-second commercial may not qualify due to its short duration. The connection between the encoding stations 12 and the Control Center 18 may be any high-speed or low-speed network connection such as telephone lines or cable networks. This transfer of information may also take place either immediately after encoding or after a delay. To illustrate this point by way of example only, and not by way of limitation, one may consider saving the metadata for one or more encodings onto a storage medium, such as a magnetic or optical disk, and subsequently sending the metadata to the Control Center 18 via email or postal delivery at a later time.

The embedded content is then sent to the broadcast network 14 for distribution to the general public and/or paying customers. In FIG. 1, a satellite broadcast example is depicted. It will be appreciated by those skilled in the art that other means of signal distribution can readily replace and/or compliment the terrestrial broadcast model. Such distribution channels include, but are not limited to, cable television distribution networks, telephone-lines, DSL and broadband networks that power the Internet and local storage devices and server farms.

At the reception sites, monitoring stations 16 continually monitor the airwaves in search of encoded content. These monitoring stations 16 may be spread throughout different geographical locations within the United States or throughout the world, monitoring a variety of AM and FM radio stations as well as Cable and Network television broadcasts. Other broadcast systems such as short-wave radio, satellite radio, local cable and Internet systems may also be monitored by including the appropriate receivers/decoders at the monitoring sites. These sites are chosen to allow simultaneous monitoring of a large number of radio and TV broadcast signals with good quality of reception. This is accomplished by using computer simulations of RF propagation in conjunction with databases of 'digital terrain' and FCC approved antenna locations, heights and broadcast powers, for finding optimum locations for the monitoring antennas. Such elaborate analysis is not required for other broadcast systems such as digital satellite broadcasts, web 'streaming' broadcasts, and local cable TV networks, where access convenience and cost are among major factors.

The Control Center 18 is an integral part of the overall monitoring system, interacting with both the embedding and detection branches. Generating detection and data reports 20, issuing embedding and distribution authorizations and discerning false detection alarms are among tasks performed at the Control Center 18. The connectivity of the Control Center 18 to the outside world is established through a variety of low- and high-speed network connections as well as operator interaction. Data and commands may also be carried via tangible storage media such as optical and magnetic disks. These and other functionalities of the Control Center 18 will be described shortly herein.

Figure 2:
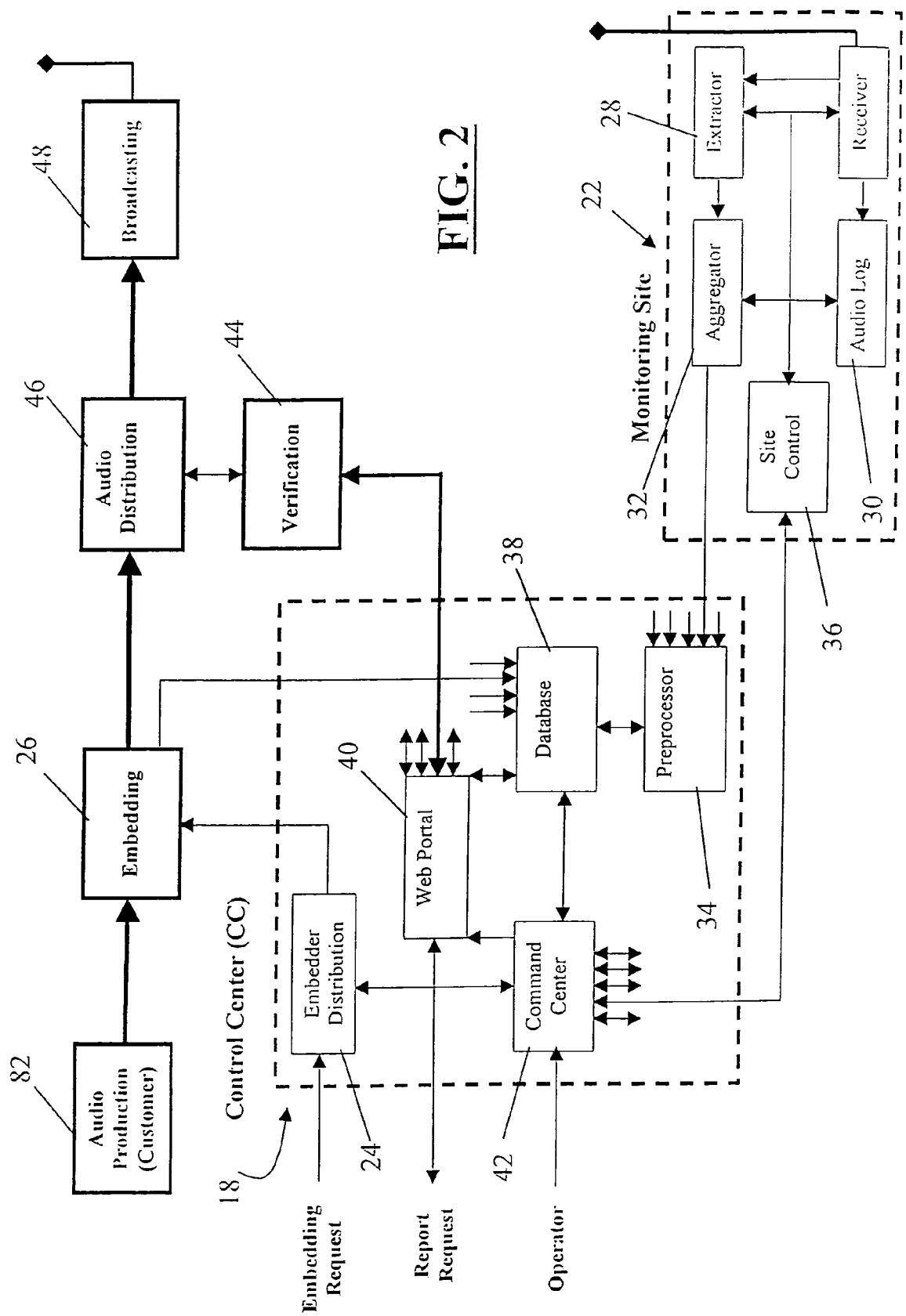
FIG. 2 is detailed block diagram of a preferred embodiment of the monitoring system.

FIG. 2 is a block diagram of a preferred embodiment of the present invention. Two dashed-line rectangles contain two major components of the system: Control Center (CC) 18 and Monitoring Site 22, which is sometimes also referred to as EAR (Event Airplay Receiver). There are many EARs that are connected to the Control Center 18 using a circuit-oriented TCP/IP Wide Area Network (e.g., virtual circuits over a frame relay cloud). This connectivity may also be realized with a variety of other topologies and techniques such as using Virtual Private Networks (VPNs) or point-to-point connections. Data communication between EARs and the Control Center 18 is done through secure protocols to ensure integrity of all reports and prevent unauthorized access. Preferably, the individual EARs are situated on the premises of independent contractors and out of the control of broadcasters, to further reduce any possibility of signal tampering. The system of FIG. 2 is capable of monitoring broadcast signals at the national, regional and/or local distribution levels. This way, the monitoring system can tap onto broadcast signals in the same way as ordinary listeners/viewers, and can detect whatever goes to the ordinary public, including broadcast interruptions, cropping of the clips, voice-overs, etc.

Figure 3:
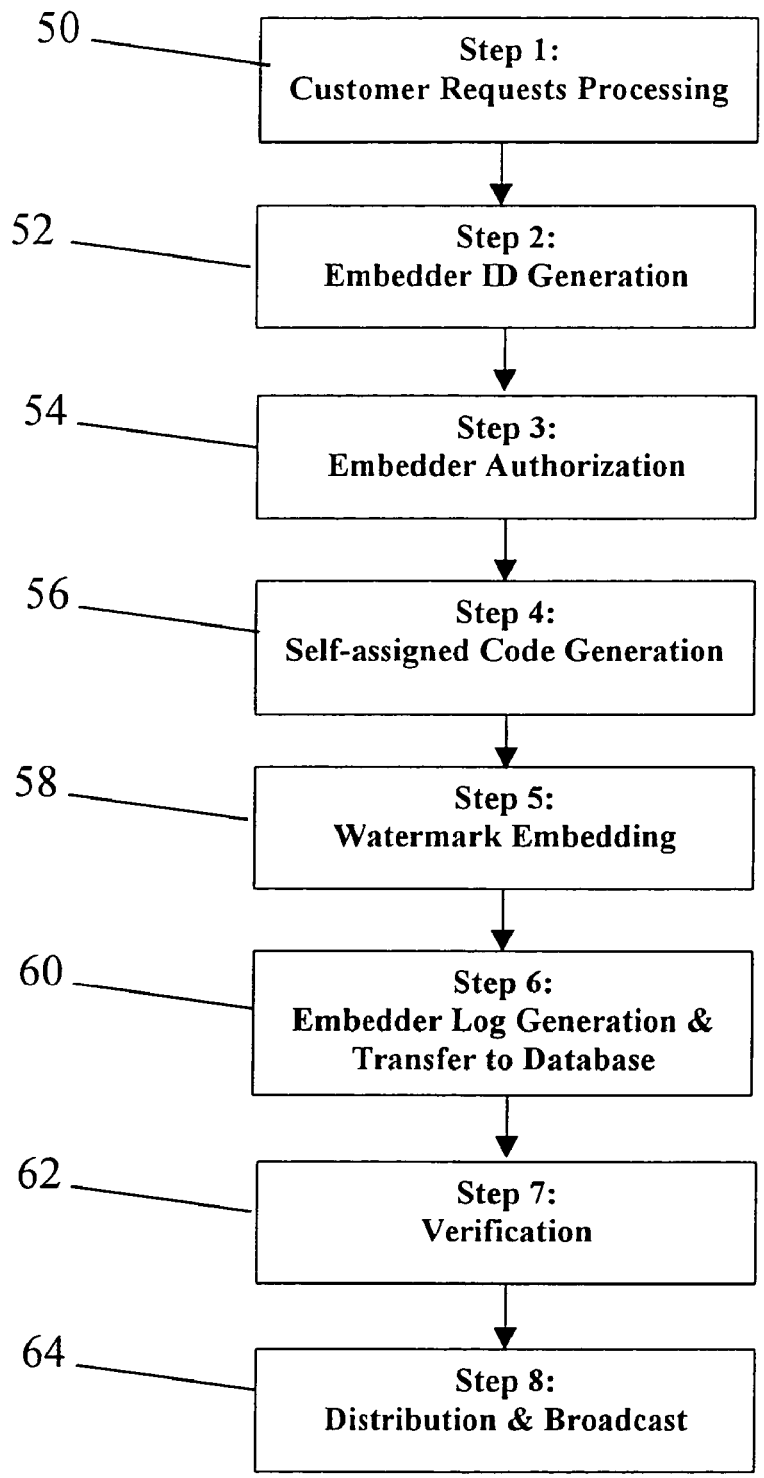
FIG. 3 is a step by step description of an encoding process in accordance with the invention.

FIG. 2 includes a number of related blocks that enable encoding of the audio source material in accordance with the steps outlined in FIG. 3. In step 1, Customer Request Processing 50, customer requests are processed which typically include customer identification documents, type of embedder required, reasons for embedding, etc. This communication may take place through sales personnel, but an automatic system for processing customer requests is preferable. In step 2, Embedder ID Generation 52, an identification code is generated which uniquely identifies the customer and the matching embedder. This Embedder ID code, which becomes part of the embedded watermark, can be used during detection to automatically identify the customer as well as the matching embedder. In step 3, Embedder Authorization 54, embedder authorization is issued to the customer. Referring to FIG. 2, steps 1 through 3 are all done in the box labeled Embedder Distribution 24. Other variations of the embedder authorization process are also possible. For example, if the embedders are in the form of software modules, they may not be authorized to operate immediately upon installation. In this case, certain key parameters of the platform (e.g. serial numbers of key hardware components) must be read and communicated to the embedder distribution module 24 before embedding authorization is issued for that particular platform. This way, proliferation of embedders and generation of duplicate codes for multiple audio pieces are prevented.

In step 4, Self-assigned Code Generation 56, a "self-assigned" code is automatically generated by the embedder, without user intervention or notification, identifying the particular audio content. In step 5, Watermark Embedding 58, the actual embedding of the watermark takes place and upon successful completion, in step 6, Embedder Log Generation and Transfer to Database 60, the Embedder ID, the self-assigned code and other embedder data are combined to form what is known as an "embedder log", which is transferred to the database 38 which resides within the Control Center 18. It is important to note that the embedder log contains embedder generated data, such as description of the audio content in terms of duration, sampling rate, number of channels, energy profile, etc., and user entered data describing the audio or audio visual watermarked content, i.e., title, owner, industry codes etc. Referring to FIG. 2, steps 4 through 6 are performed in the box labeled Embedding 26. In step 7, Verification 62, which may occur at a much later time, the embedded content is checked for the presence of a valid watermark before being distributed for broadcast in step 8, Distribution and Broadcast 64. In FIG. 2, the Verification 44, Audio Distribution 46 and Broadcasting 48 modules are used to carry out the procedures outlined in steps 7 and 8 above.

Figure 4:
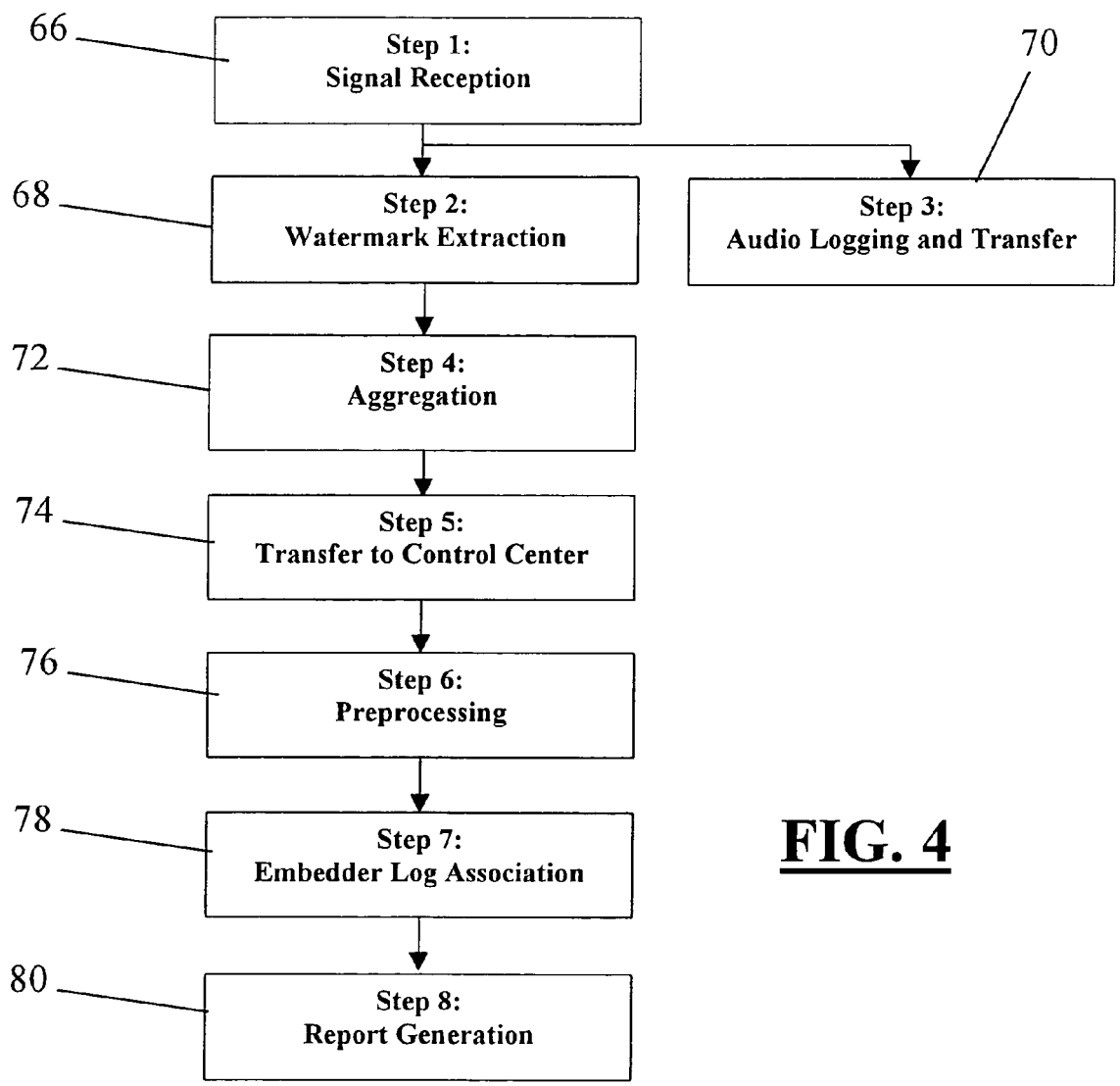
FIG. 4 is a step by step description of an extraction process in accordance with the invention.

FIG. 4 illustrates the steps required for the detection of embedded content in accordance with the preferred embodiment of FIG. 2. In step 1, Signal Reception 66, broadcast signals are received by the EARs; each monitoring site 22 is used to monitor multiple broadcasts, typically between 8 and 80 stations. Appropriate receivers are used to extract audio streams from different types of broadcast signals. For example, AM and FM receivers are utilized to receive AM and FM radio broadcasts, respectively. However, for receiving an audio signal from a TV broadcast, or an analog local cable, it suffices to simply use an FM receiver tuned to the audio carrier of TV broadcasts. In step 2, Watermark Extraction 68, the audio outputs of the receivers are examined by the extractor 28 module of FIG. 2 in order to determine whether or not they contain an embedded watermark. Since it is possible for the same content to contain different types (i.e., layers) of watermarks, the extractor 28 should be equipped to search for and report the data contained within the detected watermarks as well as the type of detected watermark. It is noted that different types of watermarks may be embedded in different content such as music, commercials, and programs. It is also possible to embed different types of watermarks in the same content, but for different purposes such as identifying the content, source, distribution path, or for copy control, etc.

In step 3, Audio Logging and Transfer 70, of FIG. 4, audio output from the receiver is compressed, using any one of the well-known audio compression techniques in the art, and saved in chunks of predefined duration with a date/time stamp. This step is performed in the Audio Log 30 module at the monitoring site 22. The stored audio logs may be retrieved by the Control Center 18 on a regular basis or in response to commands issued by the Control Center 18. The main purpose of the audio logs is to resolve disputes over discrepancies between broadcast monitoring reports and broadcaster logs. In principle, the audio logs may also be used to resolve disputes when the system erroneously detects a watermark in an un-encoded audio clip, i.e., a false detection. However, these cases are much less likely, because well-designed watermarks in the present system have very low probability of false detections. Besides dispute resolution, audio logs are useful for troubleshooting in the case of outages occurring in the broadcast system or the monitoring sites 22. Similarly, audio logs can be used to further analyze anomalous detection results, for example, detections that are short, fragmented, time-compressed, etc. While the stored audio logs are compressed in order to save storage space and transmission bandwidth, it is entirely possible to produce audio logs that are of the original broadcast quality by using less aggressive or even lossless audio compression techniques. Compression factors, and thus the audio log quality, may be changed at different monitoring sites 22 via simple commands from the Control Center 18.

As noted earlier, the same code is embedded simultaneously in multiple frequency bands and repeated many times throughout the audio clip. As a result, there are numerous watermark detections from the same audio clip. In step 4, aggregation 72 of FIG. 4, these detections are organized and combined together by the Aggregator 32 module of FIG. 2. This module is responsible for identifying all watermarks that belong to the same clip, i.e., all watermarks with identical values, and combining them together. In doing so, the preprocessor 34 may also analyze the spacing between neighboring watermarks; if the watermarks belong to the same clip they have a predefined spacing, also known as the heartbeat of the watermark. This analysis is helpful when the same clip is broadcast in a back-to-back fashion; in such cases there is a high likelihood of discontinuity in the heartbeat, which can be used for separating the neighboring clips. An aggregated string of watermarks contains the detected (common) code, start time of the first detected watermark in the string, and end time of the last detected watermark in the string. In the case of delay sensitive applications, the aggregator 32 may immediately report the first detection of a watermark in a new audio clip. It should be noted that digital equipment at the monitoring sites 22 can measure time precisely using their internal crystal based clocks. However, these clocks have precision tolerances, and drift in time. In order to compensate for the clock drift, they are periodically synchronized to a common (atomic) clock over communication lines from the Control Center 18, through a Site Control module 36.

In step 5, Transfer to Control Center 74 of FIG. 4, the aggregator module 32 sends the detection results as well as the ID of the receiver and the broadcast station frequency to the Control Center 18. This information is instrumental in identifying the source of broadcast that carries the extracted codes. The transfer of information to the Control Center 18 occurs in real-time in most cases, and a copy of the detection logs is stored locally for future reference. While FIG. 2 indicates separate links for the aggregator-to-preprocessor and the Site Control-to-Command Center modules, it is entirely possible to utilize a single link for both communication paths.

In step 6, Preprocessing 76 of FIG. 4, aggregated watermark detections, called 'arrivals', are preprocessed by the preprocessor module 34 of FIG. 2. The main task here is to convert the arrivals from multiple aggregators into 'events' by using the information contained in the database 38. The preprocessor module 34 may be called to task at several other occasions, as well. For example, in cases where multiple receivers are tuned to the same broadcast station, all arrivals are converted into a single event by the preprocessor module 34. In some cases, the aggregator 32 may not have been able to merge disjoint watermarks, either because of large gaps between the detections or due to processing delays; the preprocessor module 34 can use the information contained in the database 38 to merge those arrivals. In other cases, the same clip may be consecutively broadcast two or more times in such a way that it is erroneously identified as one long clip. In such cases, the preprocessor module 34, receiving an arrival with longer than expected duration, may perform 'reverse aggregation' and split a single arrival into two or more events. The preprocessor module 34 also contains several algorithms specific to each type of content. Therefore, the arrivals can be processed differently depending on the a priori information stored in the database 38 about the content and detection information.

In step 7, Embedder Log Association 78 of FIG. 4, all events generated by the preprocessor module 34 are transferred to the database 38 where they are associated with the matching embedder logs. Successful matches are saved in a report folder for future report generation. While a large majority of the matches are successful, there are a few instances where proper matching and identification of the events may not occur. For example, in some cases Embedder IDs may not match any of the issued Embedder IDs in the database 38. These events are stored in a 'false detections' folder for the purpose of statistical analysis. In other cases, the Embedder ID may be recognized, but the self-assigned code may not match anything in the embedder logs. These events are saved in an 'orphans' folder and are re-tested at a later time (e.g., when new embedder log files are uploaded). Finally, if all attempts in recognizing an orphan detection fail, technical support personnel may contact registered users to resolve inconsistencies.

In step 8, Report Generation 80, of FIG. 4, customer reports are generated using the appropriate folders in the database. Reports may be generated upon customer request, or at predefined periodic intervals. FIG. 2 indicates that reports are delivered through the Control Center's web portal 40, but it is certainly possible to deliver them by other means, such as e-mail, hard copy, etc. The Command Center 42 governs who has the rights to obtain reports as well as the format and the type of data in the reports. The report generation step 80 also includes formatting and customizing the final report according to the customer specifications. This allows seamless integration of the detection reports into the customer's workflow. Formatting and integration of the final report may be done internally at the Control Center 18 or performed through third party 'middleware' development (not shown in FIG. 2).

Alternative Architectures

According to a preferred embodiment of the present invention, components in FIG. 2 not contained within the dashed boxes are outside the physical control of the Control Center 18. For example, watermark embedding 26 is done outside of the Control Center 18, typically at customer premises. This is done in order to avoid transfer of audio content from the customer to Control Center 18 and back. Aside from confidentiality concerns over transport of pre-broadcast material to remote locations, the architecture of FIG. 2 avoids any possible delays in the production process due to network and workflow congestion at the Control Center 18. This architecture further simplifies the collection and storage of metadata associated with particular contents. Additionally, some cost savings are realized by avoiding the need for a high-speed connection between the customers and the Control Center 18.

There are also several disadvantages with the embedding architecture of FIG. 2. Particularly, more sophisticated embedder designs are required to maintain proper operation on different computer platforms such as PC, Macintosh, Unix and Linux at customer sites. It also becomes necessary to keep track of the status and the number of distributed embedders. Significant software and/or hardware development efforts must also be undertaken to ensure user-friendliness of the embedding tools in order to avoid embedding mistakes such as a mix-up between original and embedded files, improper embedder installation, wrong selection of embedder options, and embedding the same content multiple times. This also places more demand on customer service efforts for delivering periodic software/hardware upgrades and assisting customers. Complications may also arise if the network connection between the customer and the Control Center 18 is severed and the embedded content is aired without proper transfer of metadata to the Control Center 18. In such cases, the monitoring sites 22 may produce orphan detections that are not readily identifiable. Distributing of the embedding software to the customers may also open the possibility for unauthorized usages of embedding technology and reverse engineering.

Figure 5:
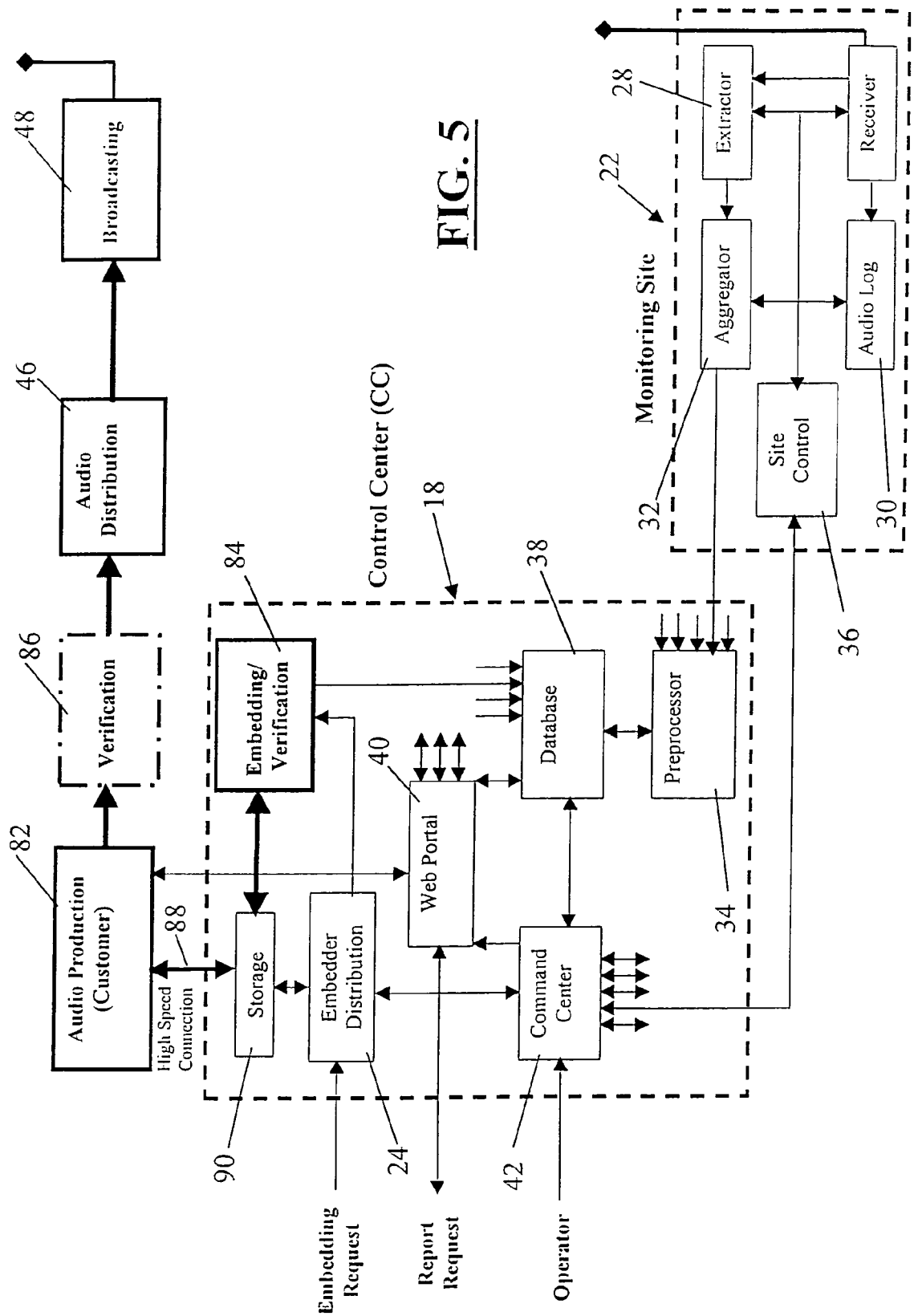
FIG. 5 illustrates a first alternate embodiment of the system of FIG. 2.

In the alternate embodiment of FIG. 5, the above and other disadvantages of the system are overcome by moving the embedding operation entirely into the Control Center 18. In the embodiment of FIG. 5 only one customer 82 is shown, but it is understood that the same architecture allows interaction with multiple customers. According to this architecture, verification and embedding operations are all done in one step, in the Embedding/Verification module 84 of FIG. 5, at the Control Center 18. The customers, however, may decide to optionally verify their content before distribution in order to avoid distribution of un-encoded material. In FIG. 5, this optional verification 86 is shown as a box with dot-dashed borders. Although it is entirely possible to utilize a portable storage medium for the transport of data between the customers 82 and the Control Center 18, the alternate embodiment of FIG. 5 indicates a high-speed connection 88 for data transfer purposes. It also requires additional storage 88 and/or buffering of incoming audio as well as the encoded content at the Control Center 18. Security concerns may also necessitate encryption of the stored audio data and presence of secure internal and external connections. Other concerns regarding the embodiment of FIG. 5 include the amount of work required to generate, enter and collect the related metadata for each and every content by the personnel at the Control Center 18. Improvements in workflow efficiency may be possible by requiring all customers to adhere to a standard information-sharing format and/or directly accessing existing databases at customer sites in order to automatically download portions of the metadata.

Figure 6:
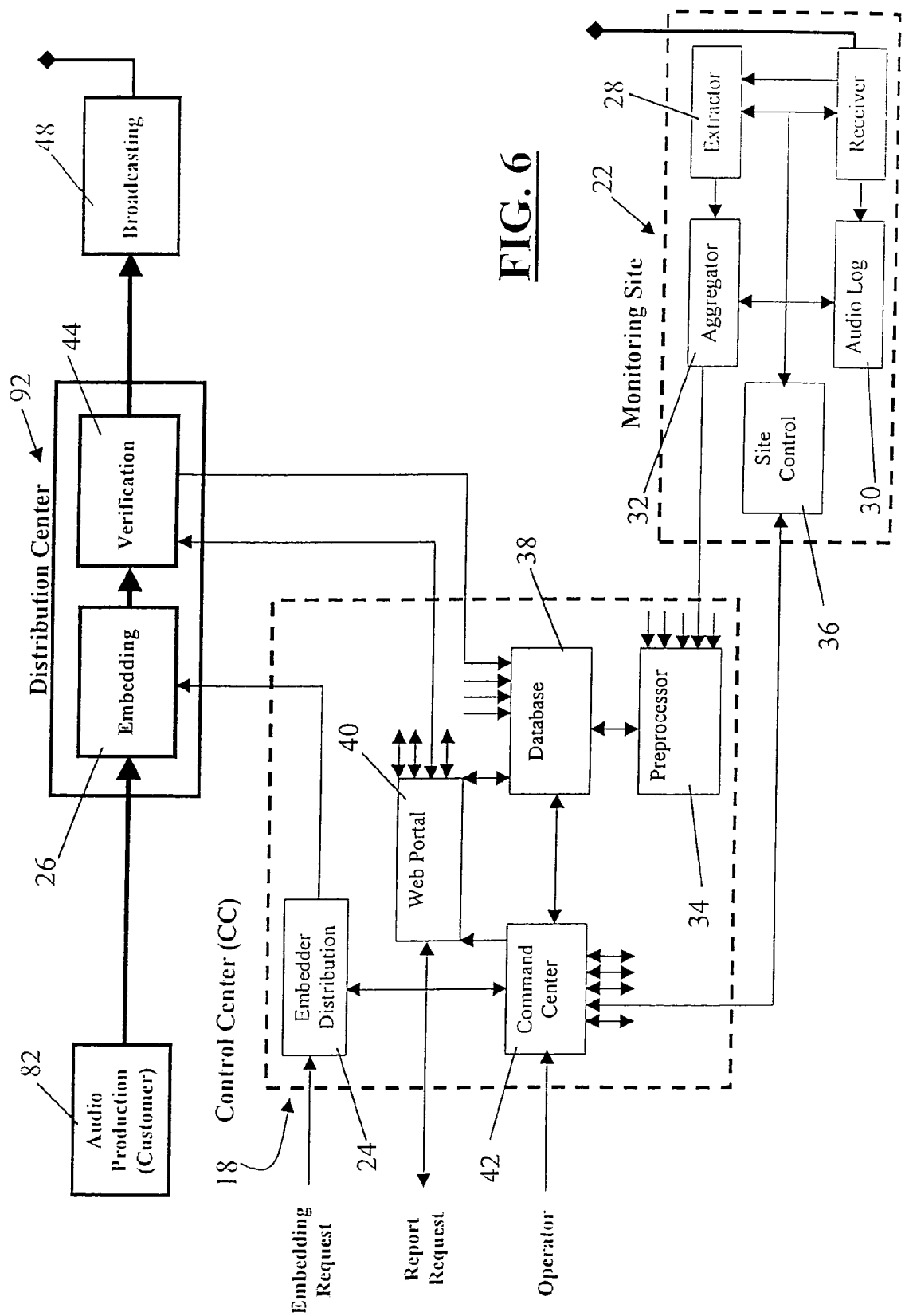
FIG. 6 illustrates a second alternate embodiment of the system of FIG. 2.

FIG. 6 illustrates another alternate embodiment of the present invention, overcoming some of the workflow, security and cost issues associated with the embodiments of FIG. 2 and FIG. 5. According to the architecture of FIG. 6, customers 82 directly send their audio and/or audio-visual content to the distribution center 92 where embedding 26 and verification 44 of content takes place. This architecture avoids the cost and security concerns of a high-speed data connection between individual customers 82 and the Control Center 18. In addition, most of the metadata-related work will be shifted to the distribution center 92 where similar tasks are usually performed for distribution and billing purposes regardless of whether or not watermark insertion is taking place.

Figure 7:
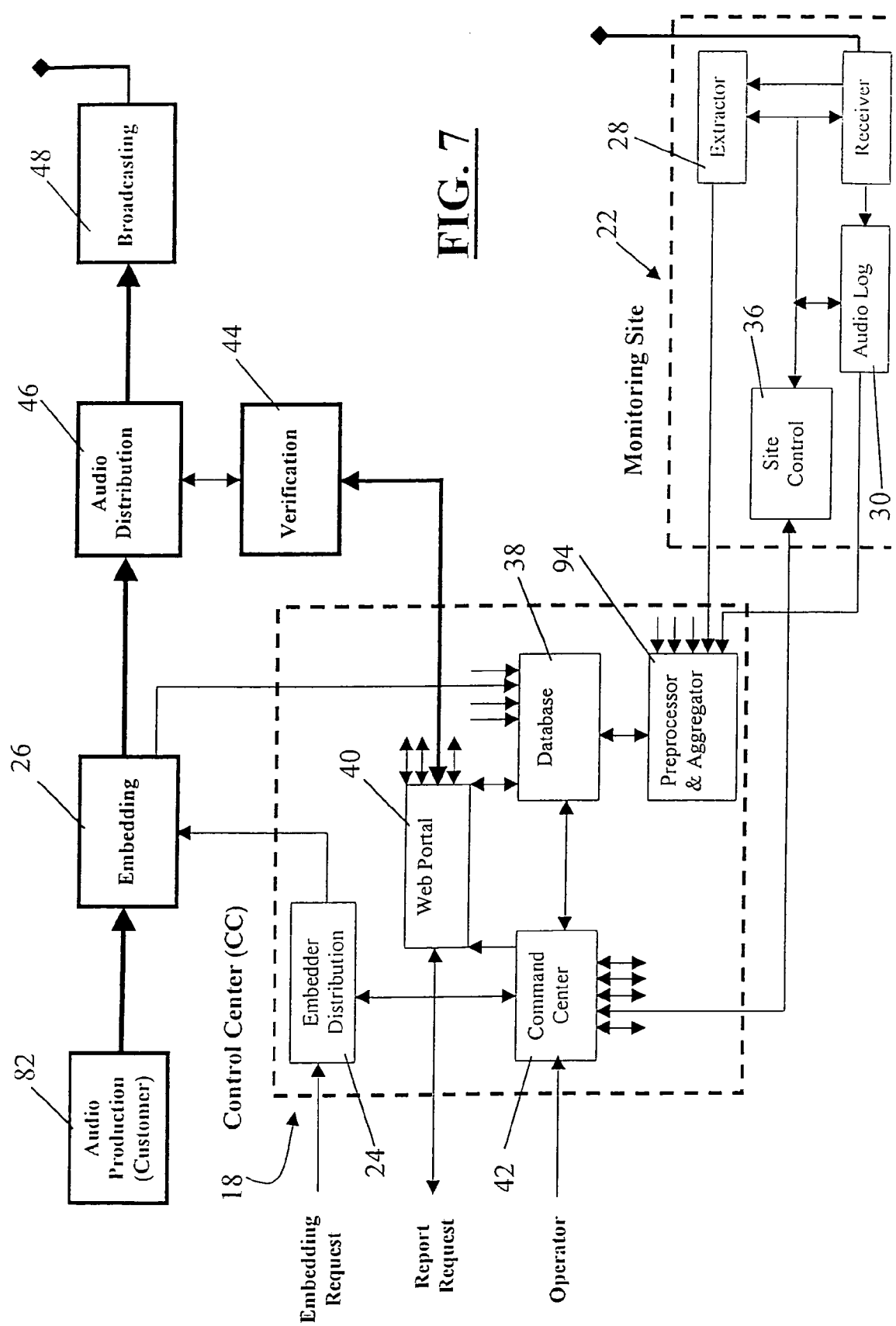
FIG. 7 illustrates a third alternate embodiment of the system of FIG. 2.

FIG. 7 shows yet another embodiment of the present invention. It was previously disclosed in FIGS. 2, 5 and 6 that each monitoring site contains an aggregator module 32. In FIG. 7, this module has been moved into the Control Center 18 to form a combined preprocessor and aggregator module 94. This way, detections from the extractor 28 are directly sent to the preprocessor and aggregator unit 94 at the Control Center 18 where sophisticated aggregation computations are performed using all available resources at the Control Center 18. In addition, fewer control commands are required to regulate the operation of each monitoring site 22. From an economics point of view, it is also advantageous to simplify the design of monitoring sites 22 by eliminating as many components as possible in order to help proliferation and maintenance of the sites, granted that the cost of transferring more detection data may not become prohibitive.

While different embodiments for the embedding, delivery and monitoring of audio content have been disclosed, it should be appreciated that various combinations of the above architectures may be used to effect suitable embedding and monitoring of different types of audio-visual content. For example, while one architecture may be used to deliver production (non-feature) music, another architecture may be used for feature music and yet another architecture may be used for TV or radio advertisements and promotions. Furthermore, while some monitoring sites may contain several sophisticated processing and storage components, others, being located in less accessible locations, for example, may contain only a few components that convey the data for further processing to the Control Center. The complexity of a monitoring site facility may also be influenced by the number and the type of channels being monitored.

Additional Features

As previously disclosed, the Site Control module 36 is used to pass commands and extract status reports from the monitoring sites 22. They are also instrumental in providing accurate timing information for aggregators and extractors and handling requests for on-demand uploading of the audio logs. However, there are many more important functions and features achieved through the communication link between the Site Control 36 and the Control Center 18. One of features is the capability to upgrade various software components that reside within the monitoring site 22. This may include a full replacement of previous software modules or just selection and/or modification of configurable parameters. For example, the monitoring site 22 may be remotely configured to detect additional types of watermarks, e.g., additional watermark layers, or to modify the parameters that are used in detection of a particular watermark layer. It is also possible to remotely switch to spare receivers in case of receiver failures, increase or decrease the number of stations being monitored, adjust certain parameters such as carrier frequency, modulation type, volume, RF attenuation, etc. Similarly, 'first packet reporting', described earlier, may be enabled or disabled in the aggregator.

The Site Control module 36 is also responsible for monitoring the overall status of the monitoring site 22 and communicating the alarm signals to the Control Center 18. These alarm signals are generated by different mechanisms, indicating the status of software, environmental and communication subsystems. For example, temperature and humidity within the monitoring sites 22 are constantly monitored and alarms are generated if they go beyond certain thresholds. Status of internal communications within the monitoring site is also periodically checked for outages and anomalies. Uninterruptible Power Supply (UPS) units may also generate alarms in order to initiate a graceful shutdown of the site. Several other alarms are also generated to assess the quality of the received audio signals. For example, at each monitoring site 22, the RF power of the incoming broadcast signal is continually measured to ensure that it is within acceptable bounds. Similarly audio levels are monitored to make certain they are within a predefined range of values. These measurements provide valuable information regarding the quality of the audio signal which may be used to predict watermark detection reliability.

Signal-to-Noise-Ratio

A standard measure of signal quality is Signal-to-Noise-Ratio (SNR). Monitoring sites 22 are capable of measuring the SNR for all incoming audio signals at the signal reception sites. One method of monitoring SNR is to compare the long-term average of audio signal power with the short-term minimum audio power. Long-term average represents a measure of signal plus noise power. Short-term power calculations, measured over several tens of milliseconds, typically represent intervals where there is no signal present, thus comprising of only noise power. So, SNR can be simply calculated from the following equation:

SNR=(Long term power−minimum short term power)/(minimum short term power)

The above technique for calculating SNR was given by way of example and not by way of limitation. Other SNR calculation techniques may be utilized where appropriate. For example, a different method may be applied if a pilot signal used for demodulation is included in the broadcast. This is the case for FM radio and TV broadcasts, where pilot signals are inserted at 19 KHz and 15.75 KHz, respectively. In such broadcasting techniques, the natural audio components around the pilot frequency are removed prior to broadcast. Accordingly, any signal that is detected in the received audio in the vicinity of the pilot signal can be safely attributed to channel noise. In this case, the method of estimating the SNR is based on comparing the signal power in the vicinity of the pilots with the overall power level of received audio.

Using the calculated SNR values, it is possible to continually monitor and log the quality of different audio stations. Alarms generated based on SNR anomalies, in addition to other alarms generated due to, for example, variations in mean signal RF and volume levels, may be used to prompt the Control Center personnel to take appropriate actions. These alarms could be the result of monitoring site equipment failures, broadcast interruptions or poor quality of broadcast signals. In the monitoring system of the present invention, all monitored broadcast channels are periodically assessed in a process known as "channel grooming." The results can be used to predict and improve the watermark detection success rates. In addition, the channel quality information for each geographical location may be shared with the customers and broadcasters. Broadcasters may use this information, for example, to boost their transmission power at certain locations and/or during certain time periods.

Watermark Verification

Embedded audio watermarks in the present invention are substantially inaudible; it is virtually impossible to discern whether or not an audio clip contains a watermark by just listening to it. It is thus essential to systematically verify the presence of a watermark before embedding and before distributing the content for broadcast. As described previously in relation to various embodiments of the present monitoring system, verification may be performed at different points in the encoding chain. For example, it is important to determine whether or not an audio segment already contains a watermark before attempting to re-embed the content. This task can be accomplished with an "integrated extractor" as part of the embedding engine. This way, embedding may be aborted or interrupted if a watermark is detected. In a basic configuration, it suffices to signal the presence or absence of a watermark by an appropriate display or a flag while identifying the clip by just listening to the content. In more sophisticated applications, however, such as automatic inventory of audio clips, it is necessary to convey the metadata related to the watermark back to the Control Center 18. The database inquiries can also clarify the status of a watermark. Some of the detected watermarks may be attributed to test trials conducted at the customer sites or simple mislabeling of the content. In such cases, the Control Center 18 has either no information about the detected watermark or it correctly identifies the customer as the rightful owner of the audio segment.

Other detections may be due to presence of additional watermarks within the content. As previously disclosed, several watermark layers may be inserted into the same audio content for different purposes. By reporting all detections to the Control Center 18, one can track all embedded content, even those embedded previously by a different content owner. This way, for example, the rightful owner of a music piece would be able to collect royalties if his/her music were used in a TV commercial. Detection of different watermark layers is possible at other points within the disclosed monitoring system, as well. For example, as will be described shortly, it may be done at the Verification stage that follows embedding, or it may be done at the monitoring sites after receiving the broadcast signal. This is possible since embedding of one watermark layer over another does not usually obliterate either layer. However, one or more of the layers may be weakened. Furthermore, in the presence of transmission channel noise accompanying broadcast signals, it may be more difficult to reliably detect the presence of older watermarks at the monitoring sites. In such cases, the information residing at the database can be used to verify the existence of all watermarks.

It is also important to verify the presence of a valid watermark before the audio segment is distributed for broadcast. This is done by the block labeled 'Verification' 44 in FIG. 2. The functionality of the verifier is very similar to the integrated extractor, described above, as it searches through the audio segment to detect and report the presence of all embedded watermarks. In a stand-alone configuration, the presence or absence of a watermark may be signaled using an appropriate display or a flag. In a verification scheme with connectivity, the detected watermarks are reported back to the Control Center 18 and checked for validity.

Figure 8:
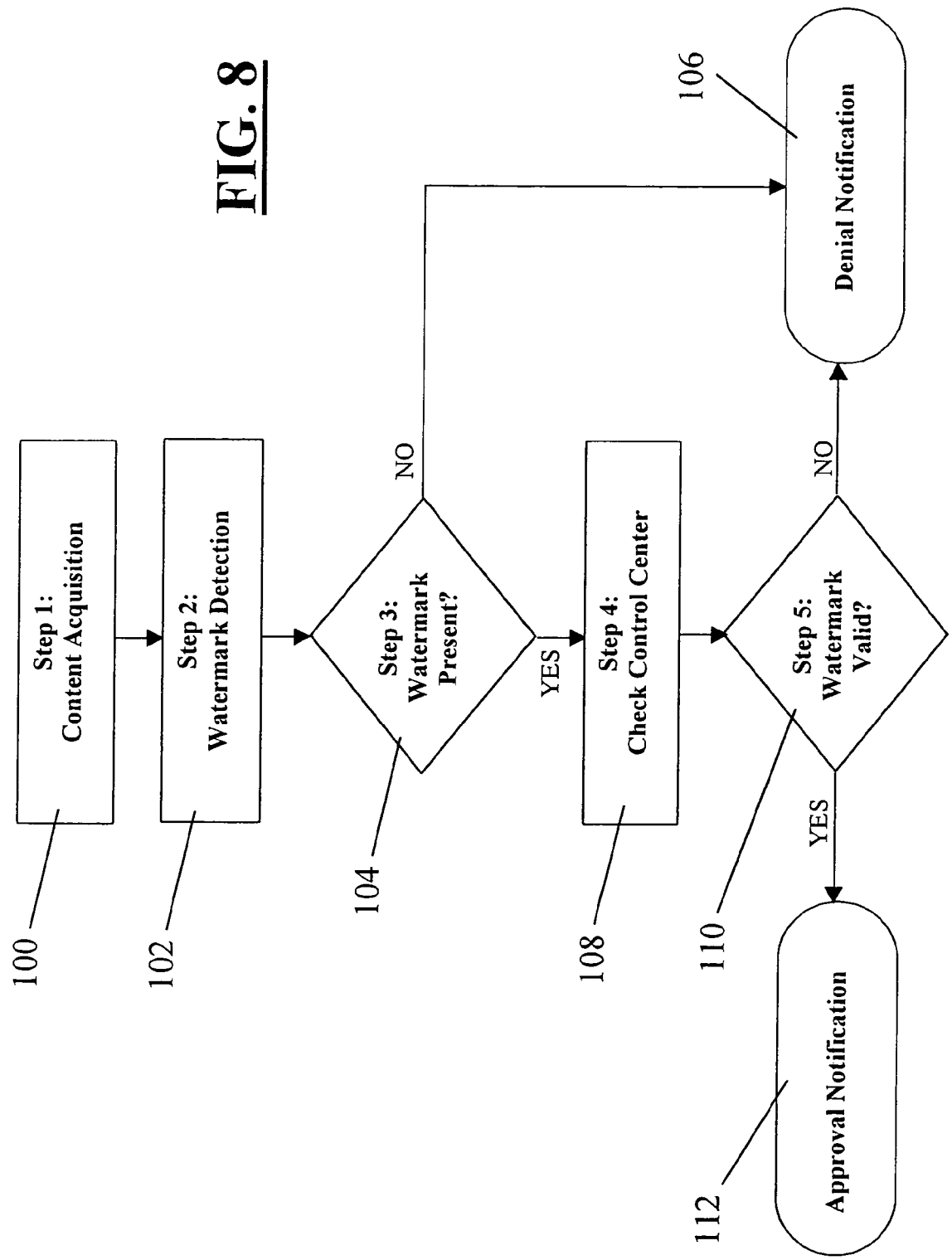
FIG. 8 is a step-by-step description of a fail-safe verification process.

The presence of additional watermarks may also be reported and logged. The connectivity between the database and the verifier may also be used to implement a fail-safe verification technique. This procedure is described in FIG. 8. The process starts in step 1, Content Acquisition 100, by acquiring the audio content prior to distribution for broadcast. In case of an audio-visual content, the audio portion must be separated from the visual content and the signals. If the audio is in analog form, it must be converted into digital form. In step 2, Watermark Detection 102, the content is checked for the presence of watermark. In step 3 (104), a decision is made based upon whether or not a watermark was detected in step 2. If embedded watermarks are not detected, a 'Denial Notification' 106 is issued. This notification could be in the form of a beep or a visual alert, or could include physical interference with the shipping procedure. Some examples of this physical interaction will be given shortly. If embedded watermarks are detected, in step 4, Check Control Center 108, watermark information is communicated back to the Control Center 18 and checked for validity. In step 5 (110), a decision is made to issue a 'Denial Notification' 106 for invalid watermarks or an "Approval Notification' 112 for valid watermarks. A detected watermark may be declared invalid, for example, if no matching metadata is found at the database, i.e., an orphan watermark, or if the watermark has expired or does not contain the proper embedder ID, etc.

Obviously, successful operation of the above system requires timely uploads of the embedder logs upon successful embedding of the content. An approval notice could be in the form a beep or visual cue as well as more sophisticated physical interaction with the workflow. For example, the verification system could be set up so that once an approval notice is issued, the audio filename is changed to conform to the shipping workflow specification. Alternatively or additionally, an approval label may be printed and placed to the disk or the tape that is used for the transportation of content. The complexity and reliability of the verification process strongly depends on workflow procedures and resources available at the verification sites. While in some instances, such as the system described in FIG. 6, the above fail-safe verification system may be an invaluable resource, in other architectures, such as the system of FIG. 2, it may not be economically feasible.

Optimized Detection and Reporting

One of the features of the disclosed monitoring system is that it allows transfer of a variety of information to the Control Center 18 upon successful completion of embedding. This includes embedder- and watermark-related ID information as well as other parameters, generally referred to as "detectability metric." Since the robustness of an embedded watermark is related to the characteristics of the particular audio segment, a set of embedded watermarks may exhibit different degrees of resiliency to channel distortions if embedded within different audio segments. Detectability metric, conveyed to the Control Center 18 after embedding of each segment, indicates how well the embedding process succeeded in encoding the content and predicts how reliably the embedded watermarks can be detected after undergoing various amounts of distortion and noise during broadcast and reception. This information may be provided to the users of the system, which in turn, may decide to increase the embedding strength to improve detection probability. Alternatively or additionally, the detectability metric may be used to diagnose why a certain embedded content may not have been detected at the monitoring sites. It will be later described how the detectability metric and SNR measurements can be combined to improve detection probability.

Among other information relayed to the Control Center 18, after embedding is the exact duration of the embedded segment. This way, upon extraction of watermarks it is possible to detect if the original clip has been shortened for broadcast. Note that some audio clips begin and/or end with silence, typically as a means for separation between clips, but sometimes due to presence of video without audio. During embedding, the initial silence interval is automatically detected and skipped; embedding starts only when audio signals are present. This feature is particularly helpful in detection of short clips, where loosing the initial portion of the first embedded watermark may affect overall detectability. The duration information for such clips can be more precisely determined by combining the information obtained from watermark detection with duration information contained in the database.

User selectable parameters such as watermark strength, dither algorithm, psycho-acoustic model for adjustment of watermark strength, etc. allow user control over transparency and/or detectability of the watermark. These parameters are included in the metadata and subsequently transferred to the database 38 and stored as the embedder log. The embedder log information can be used to optimize the reporting process. For example, if weak watermarks are being processed, only channels with good signal quality may be reported and if strong watermarks are being processed, marginal channels may be included as well.

Dynamic Decoding

Knowledge of watermark quality, prior to detection, coupled with knowledge of channel quality parameters, for example, the SNR value, the Bit Error Rate (BER), etc., can be used to implement a 'dynamic decoding' technique. There are several levels of error correction and packet detection strategies used during extraction of watermarks in the disclosed monitoring system. At one level, well-known error correction codes, for example Reed-Solomon and BCH codes, are used to detect erroneous watermark bits and subsequently correct them. Error correction capabilities may be further improved by probabilistically assigning 0 and 1 values to the extracted bits. This technique is also known as soft-decision decoding. Still, at a different decoding level, once a single watermark packet is successfully detected, forensic techniques are used to predict the presence or absence of future and past watermark packets. In addition, since watermarks in the present system are redundantly encoded, averaging techniques may be utilized to improve the detection probability.

In an error-free communications channel, where perfect embedding, transmission and reception of watermarks are carried out, such error correction and detection techniques are not needed. In all other cases, however, depending on the amount of noise in the channel, some or all of the above may become necessary. In such cases, certain parameters and thresholds must be selected to effect maximum detection while minimizing the probability of false watermark detections. Examples of these parameters include, but are not limited to, the following: maximum number of errors to be corrected by the Reed-Solomon decoder, number and threshold of probabilistic levels assigned to "soft" bits, minimum number of packets that needs to be collected for implementing averaging techniques, thresholds for forensic detection, etc. These parameters may further be dynamically optimized according to the quality of the particular transmission/embedding channel. The dynamic decoding technique, in its simplest form, entails having different sets of decoding parameters for differing channel qualities, i.e., for different SNR values. More sophisticated systems involve decoding of at least one watermark packet, searching the database to obtain the detectability metric for that segment and setting more or less aggressive decoding parameters based on channel quality-detectability combination. By way of example only, and not by way of limitation, decoder settings versus different channel quality and detectability levels are displayed in the following TABLE:

| Watermark Detectability | Channel Quality | Decoder Setting |
|---|---|---|
| Good | Good | Setting 1 |
| Good | Bad | Setting 2 |
| Bad | Good | Setting 3 |
| Bad | Bad | Setting 4 |

While only two levels of detectability and channel quality are shown in the TABLE above (either good or bad), it is appreciated that these parameters may be classified using more than two levels, in which case, more decoder settings may be necessary.

Real-Time vs. File Mode Embedding

As previously mentioned, the embedder may be implemented using software, hardware or a combination of both components. In addition, embedders may be used at different locations within the distribution chain, as described in FIG. 2, FIG. 5 and FIG. 6. Depending on the application, location, available resources and workflow, embedding may be done in real-time or file mode. In a file-mode implementation, audio watermarks are embedded into audio files without much consideration for delay or synchronization issues. Embedding can be done one file at a time, or on a series of files in what is called "batch processing."

Figure 9:
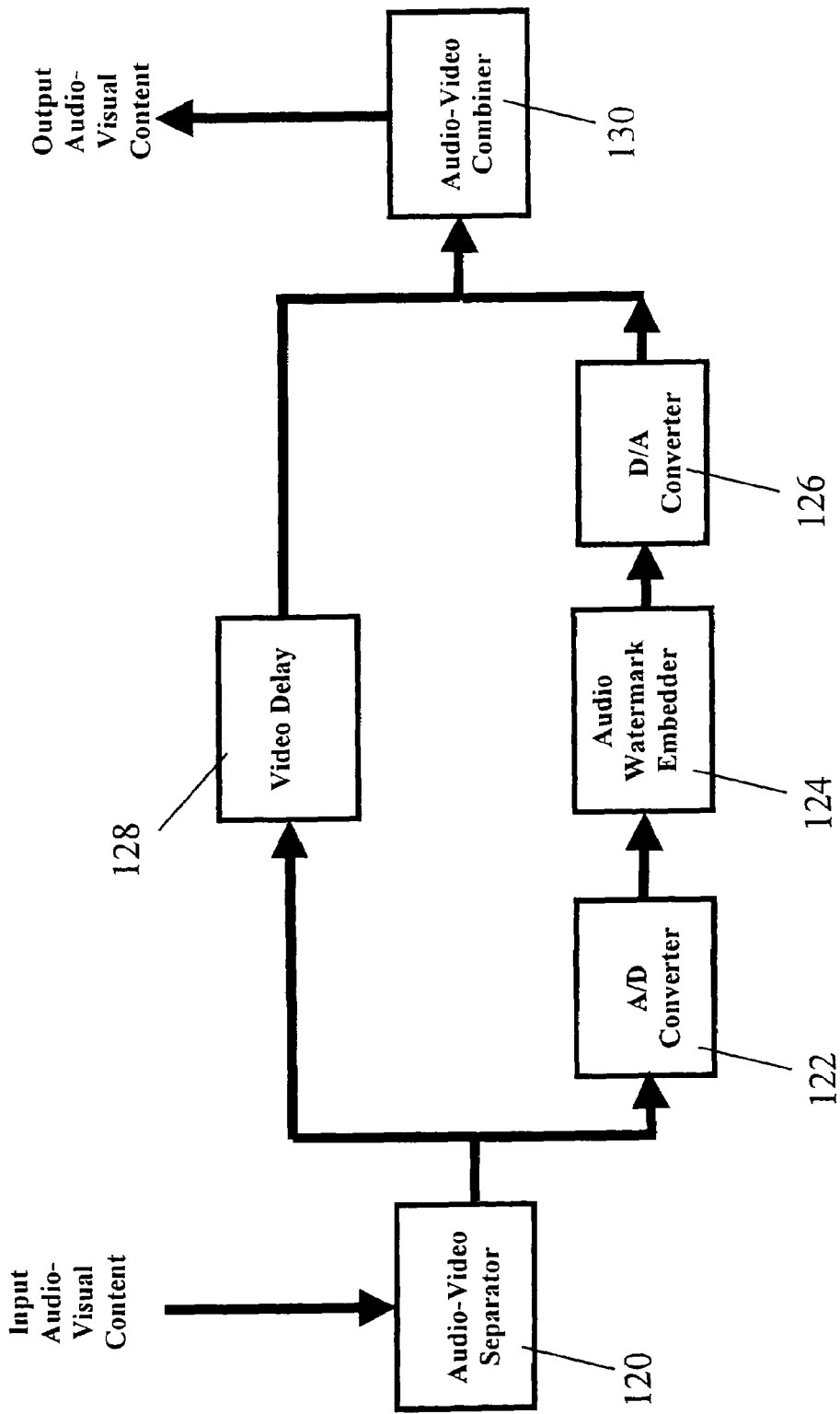
FIG. 9 is block diagram illustrating a real-time embedding process.

Real-time applications include embedding of live or streaming events, and applications where embedding is done during the transfer of content from one storage medium to another. The latter includes tape-to-tape, server-to-tape, server-to-disk, tape-to-disk and other transfers of recorded audio or audio-visual information. The challenging task of a real-time encoder is to embed the audio watermark while maintaining synchronization between the audio and video portions of the input signal. FIG. 9 shows a block diagram of an exemplary real-time encoding system for an analog audio-visual input signal. In accordance with this figure, after multimedia components are separated in Audio-Video Separator 120, the analog audio signal is digitized in the A/D Converter 122, embedded in Audio Watermark Embedder 124, and converted back into analog form, in D/A Converter 126, while the video portion remains idle in the video delay block 128. Next, the embedded audio is combined with the corresponding video signal in Audio-Video Combiner 130 and is made available for further processing and/or transmission. The video delay block 128, shown in FIG. 9, accommodates fixed pipeline delays in the system and ensures proper audio-video synchronization. These delays may be due to internal and/or external loading and transfer of audio data; typically a video delay buffer of a few video frames is sufficient. The real-time watermarking engine depicted in FIG. 9 needs to process the incoming audio signal at a fast enough rate to maintain synchronization with the corresponding video frames. In NTSC-encoded video, frames are separated by approximately 33 milliseconds; it is desired to maintain synchronization to within a fraction, for example, one-tenth, of one frame duration. It is possible, with today's microprocessor capabilities, to implement such an engine using entirely software modules. However, if more embedding features and/or processing steps are added, real-time embedding using an all- or part-hardware implementation may be preferable.

Other variations of the system of FIG. 9 are certainly possible. For example, in an all-digital system, A/D and D/A conversions are not necessary yet it may become necessary to process compressed input signals. In such systems, the input audio and/or video signals must be decompressed, embedded with audio watermark and then converted back to their original compressed format. In other exemplary systems where audio and video portions of the input signal are completely separate from each other, audio-video separation 120 and combination 130 modules, depicted in FIG. 9, become irrelevant. Still, in other systems, metadata streams containing information such as time code, are included in the audio and video signals. In such systems, not only audio, video and metadata streams need to be separated, but also synchronization must be maintained among multiple streams. Finally, batch processing can also be made possible in a real-time embedding system by providing an embedding list of time instances when a new clip begins and ends.

Local, Regional and National Monitoring

Given the vast geographical coverage of the disclosed monitoring system, it is possible to provide monitoring capability at local, regional and national levels. This feature is particularly useful for monitoring radio and TV commercials where local media distributors may (or may not) replace the national advertisements with local ads. Since such replacements are not done on a regularly scheduled basis, it is important for the content owners to precisely know when, where and how many times their program segment was broadcast. Using the present invention's satellite, cable and Internet monitoring capabilities, it is possible to provide such detailed reports to the customers. The detection results are collected at the Control Center 18 and processed in order to generate the pertinent information for each advertiser.

Redundant Monitoring

The monitoring capabilities of the present invention may be further enhanced by taking advantage of a redundant network of receivers. Redundant monitoring is accomplished in several ways. Multiple receivers may be able to monitor the same station because of geographical coverage overlap between monitoring sites. In addition, the same content may be monitored simultaneously through different types of channels such as over-the-air, local and national cable broadcast channels. It is also possible to intentionally tune multiple receivers, of the same channel type, to the same station in order to improve reliability of detection and/or for troubleshooting purposes. Redundant monitoring can be used to improve the accuracy of timing information generated for detected clips. Such information may be used, for example, to tie a commercial to a particular show.

Channel Quality Assessment

As noted above, the quality of received RF signals, volume levels, and other signal parameters can be monitored at the monitoring sites. In addition, SNR values corresponding to individual channels can be continually calculated for the incoming signals throughout the monitoring system. The above parameters can be evaluated regardless of the presence or absence of watermarked content. It is additionally possible to use the detected watermarks for channel quality assessment. For example, it is possible to determine whether or not the broadcast content has undergone time compression by measuring the duration of detected watermarks. Time compression artifacts may arise due to ordinary processing of content via substandard equipment or could be the result of intentional processing by an unscrupulous broadcaster in order to make room for additional advertisements. Nevertheless, it is important for the customer to be aware of such possible channel impairments. Similarly, it is possible to measure wow and flutter, typically associated with analog tape players, and the amount of noise in the broadcast channel (e.g., by measuring bit-error-rate). Analyzing the quality of detected watermarks in the frequency domain and assessing the extent and type of damage to watermarks in each frequency band can also shed light on possible frequency domain impairments such as bandpass filtering and compression. The information regarding channel quality can be provided to the interested customers as well as broadcasters. They can also provide a measure of confidence about detection rates on particular channels.

Network Identification

One of the watermark layers deployed in the present monitoring system is utilized by the Radio and Television Networks to identify and monitor the times and programs where a network affiliated local station is carrying the network's broadcast signal. This information may be important to the networks in order to measure and verify compliance. In the case where content is distributed to the network as local or regional stations, this capability allows for differentiating the different sources. Real-time embedders may be deployed in the network facilities to ensure all content is watermarked.

International Deployment

The Broadcast Monitoring Network may also be expanded internationally, allowing content encoded in one country to be detected at the country of origin or in any other country where monitoring devices are available. For the purpose of maintaining compatibility, a set of design constraints is defined for the various subsystem blocks. These constraints may be classified in two categories, where the first category contains the physical and logical layers of the system and the second has more to do with the metadata and detection data exchange. These constraints include, and are not limited to, the definition of certain core rules that govern the underlying watermarking technology and how it is applied in the broadcast monitoring system, the minimum set of data fields that insure proper dialog between systems in the different countries.

Content Tracing

The broadcast monitoring may also reveal the unauthorized airing of certain content, in cases where the content is earmarked for preview only or before official releases. A set of rules around the metadata of such content will allow for the tracing of the aired copy.

Other Applications

Monitoring and data collection capabilities of the present invention can be utilized in other ways, as well. One such application relies on the fact that most people may not pay particular attention to radio and TV commercials at the exact moment of their broadcast. Yet, at some later time, when they are in search of a particular service or product, they may become interested in special promotions and discounts. The advantage of the disclosed monitoring system is that it retains the exact knowledge of time and geographical location of certain broadcast commercials. It also has the capability of replaying those commercials by directly accessing the stored audio logs. In addition, if certain information about the content, for example, a contact phone number or an Internet link, is included in the embedder log for each content, the Control Center database 38 is further capable of providing such contact information to an interested consumer. These features of the present monitoring system make it a suitable candidate for becoming a secondary source of direct advertisement to targeted audiences based on geographical location. As an example, someone that is interested in buying a car may use the present system to obtain a list of all auto-related advertisements, promotions or discounts that have aired in a particular region in the span of a few days. In addition, the present system can provide a replay/reprint capability of commercials for the interested consumer. In effect, this system becomes a repository of aired commercials that are readily available for re-utilization.

There are many possibilities on how to access this system. Connectivity to the system may be realized through a variety of means, some of which include an Internet connection, a cell phone, a PDA with connectivity, a TV with connectivity, a car radio with cell phone connectivity, a GPS car navigation system with connectivity, etc. Implementation of this system requires expansion of the system resources in order to cope with increased access and processing demands. It also requires a large base of embedded broadcast content in order to provide sufficient diversity in the database of stored advertisements.

Based on the port of entry and capabilities of devices available to the consumer, the commercials may be replayed in full or referenced in an abbreviated manner (e.g., www address, phone number, etc.). The user interface can also have sorting and searching capabilities and may even automatically alert the user if a commercial is played that meets a pre-selected criterion tailored to the user's liking. Other possibilities include printing out the commercial in text form (via for example, conversion of the audio log segments to text form via voice-to-text software), automatically dialing a phone number, mapping the location of the advertiser on a GPS navigation system, or even buying the product.

One advantage of the above system is that commercials need to only air in one medium (for example, on the local AM station) yet, they can be made available to a wide range of audiences that access the system's repository. Further extensions can involve inclusion of print media commercials into the system; metadata for all local print media may be routed to the local monitoring station or directly to the Control Center.

As is evident from the foregoing description, certain other aspects of the invention are not limited to the particular details of the embodiments illustrated, and it is therefore contemplated that other modifications and applications will occur to those skilled in the art.

What is claimed is:

1. A method for monitoring broadcast multi-media content, comprising:
    (a) receiving multimedia source content;
    (b) generating identification information related to said multimedia source content;
    (c) imperceptibly and repeatedly embedding an audio component of said multimedia source content with said identification information to produce an embedded multimedia content;
    (d) transferring said identification information to a central repository;
    (e) transmitting said embedded multimedia content through one or more broadcast networks;
    (f) receiving said embedded multimedia content after transmission through said one or more transmission channels;
    (g) processing said received multimedia content to extract identification information related thereto, wherein multiple copies of embedded information are extracted to estimate a duration of multimedia content embedded with identification information.

2. The method of claim 1, wherein a detectability metric is produced by assessing the success of said embedding and said detectability metric together with said identification information is transferred to said central repository.

3. The method of claim 2, wherein said detectability metric is used at monitoring sites to improve reliability of detection reports.

4. The method of claim 2, wherein said detectability metric and measured transmission channel characteristics are used at said monitoring sites to improve reliability of multimedia monitoring.

5. The method of claim 4, wherein said received transmission channel characteristics comprise at least one of a Signal-to-Noise-Ratio (SNR) and a dropped packet rate.

6. The method of claim 2, wherein said identification information is re-embeddable with modified embedding strength based on said detectability metric.

7. The method of claim 1, wherein extraction of said identification information is conducted in the presence of multiple transmission channel impairments.

8. The method of claim 1, wherein said embedding is repeated in temporal domain.

9. The method of claim 1, wherein said embedding is repeated at different frequencies.

10. The method of claim 1, wherein said embedding is repeated in both temporal and frequency domains.

11. The method of claim 1, wherein said multiple copies of embedded information are extracted to improve reliability of multimedia monitoring.

12. The method of claim 11, wherein said multiple copies are extracted from said embedded multimedia content received from a single transmission channel.

13. The method of claim 11, wherein said multiple copies are extracted from said embedded multimedia content received from a plurality of transmission channels.

14. The method of claim 11, wherein said multiple copies are extracted using a redundant network of receivers.

15. The method of claim 14, wherein said redundant receivers are deployed in separate geographical locations.

16. The method of claim 1, wherein said embedded multimedia content is transmitted over at least one terrestrial broadcast channel.

17. The method of claim 1, wherein said embedded multimedia content is transmitted over at least one Internet broadcast channel.

18. The method of claim 1, wherein said embedded multimedia content is transmitted over at least one cable broadcast channel.

19. The method of claim 1, wherein said embedded multimedia content is transmitted over at least one satellite broadcast channel.

20. The method of claim 1, wherein said extracted identification information is used to identify at least one of:
  (i) a broadcast advertisement content,
  (ii) a broadcast music content,
  (iii) a broadcast television or radio program content.

21. The method of claim 1, wherein:
  effectiveness of monitoring is enhanced by measuring received transmission channel characteristics to provide a measure of quality of at least one of a received transmission or a transmission channel.

22. The method of claim 21, wherein said received transmission channel characteristics comprise at least one of Signal-to-Noise-Ratio (SNR) and dropped packet rate.

23. The method of claim 1, wherein a type and an extent of impairments present in a transmission channel are identified based on quality of information extracted from said embedded multimedia content carried on said channel.

24. The method of claim 1, wherein multiple points of origin of a composite transmission of said embedded multimedia content are differentiated.

25. The method of claim 24, wherein said multiple points of origin comprise at least one of:
  (i) a local broadcast segment of a given networked television broadcast,
  (ii) a regional broadcast segment of a given networked television broadcast,
  (iii) a national broadcast segment of a given networked television broadcast,
  (iv) an interstitially inserted advertisement in an Internet stream.

26. The method of claim 1, wherein, prior to transmission of said embedded multimedia content, said embedded multimedia content is examined for a presence of a valid watermark.

27. The method of claim 26, wherein validity of an embedded watermark is ascertained by verifying identification information obtained from extraction of said watermark against information residing in a database.

28. A method for monitoring broadcast multi-media content, comprising:
  (a) receiving multimedia source content;
  (b) generating identification information related to said multimedia source content;
  (c) imperceptibly and repeatedly embedding an audio component of said multimedia source content with said identification information to produce an embedded multimedia content;
  (d) transferring said identification information to a central repository; and
  (e) transmitting said embedded multimedia content through one or more broadcast networks, wherein
  copies of embedded information are extracted from said transmitted multimedia content, and
  spacing of said extracted copies of embedded information is used to estimate boundaries of back-to-back encoded multimedia clips.

29. A system for monitoring broadcast multi-media content, comprising:
  (a) a receiver configured to receive multimedia source content;
  (b) identification information generating means configured to generate identification information related to said multimedia source content;
  (c) an embedder configured to imperceptibly and repeatedly embed an audio component of said multimedia source content with said identification information to produce an embedded multimedia content;
  (d) transfer means configured to transfer said identification information to a central repository;
  (e) a transmitter configured to broadcast said embedded multimedia content through one or more broadcast networks;
  (f) reception means configured to receive said embedded multimedia content after transmission through said one or more broadcast networks; and
  (g) a processor configured to process said received broadcast multimedia content to extract identification information related thereto, wherein extraction of multiple copies of embedded information is used to estimate a duration of multimedia content embedded with identification information.

30. The multimedia monitoring system of claim 29, further comprising watermark assessment means configured to produce a detectability metric by assessing the success of said embedding and transfer means for transferring said detectability metric together with said identification information to a central repository.

31. The multimedia monitoring system of claim 30, wherein said detectability metric is used at monitoring sites to improve reliability of detection reports.

32. The multimedia monitoring system of claim 30, wherein said detectability metric and measured transmission channel characteristics are used at said monitoring sites to improve reliability of multimedia monitoring.

33. The multimedia monitoring system of claim 30, wherein said identification information is re-embeddable with a modified embedding strength based on said detectability metric.

34. The multimedia monitoring system of claim 29, wherein extraction of embedded information is conducted in the presence of multiple transmission channel impairments.

35. The multimedia monitoring system of claim 29, wherein said embedding is repeated in temporal domain.

36. The multimedia monitoring system of claim 29, wherein said embedding is repeated in different frequency domains.

37. The multimedia monitoring system of claim 29, wherein said embedding is repeated in both temporal and frequency domains.

38. The multimedia monitoring system of claim 29, wherein extraction of said multiple copies of embedded information is used to improve reliability of multimedia monitoring.

39. The multimedia monitoring system of claim 29, wherein said multiple copies are extracted from said embedded multimedia content received from a single transmission channel.

40. The multimedia monitoring system of claim 29, wherein said multiple copies are extracted from said embedded multimedia content received from a plurality of transmission channels.

41. The multimedia monitoring system of claim 29, wherein said multiple copies are extracted using a redundant network of receivers.

42. The multimedia monitoring system of claim 41, wherein said redundant receivers are deployed in separate geographical locations.

43. The multimedia monitoring system of claim 29, wherein at least one of said one or more broadcast networks is a terrestrial broadcast channel.

44. The multimedia monitoring system of claim 29, wherein at least one of said one or more broadcast networks is an Internet broadcast channel.

45. The multimedia monitoring system of claim 29, wherein at least one of said one or more broadcast networks is a cable broadcast channel.

46. The multimedia monitoring system of claim 29, wherein at least one of said one or more broadcast networks is satellite broadcast channel.

47. The multimedia monitoring system of claim 29, wherein said extracted identification information is used to identify at least one of:
  (i) a broadcast advertisement content,
  (ii) a broadcast music content,
  (iii) a broadcast television or radio program content.

48. The multimedia monitoring system of claim 29, wherein effectiveness of monitoring is enhanced by measuring received transmission channel characteristics to provide a measure of quality of at least one of a received transmission or a transmission channel.

49. The multimedia monitoring system of claim 48, wherein said channel characteristics comprise at least one of a Signal-to-Noise-Ratio (SNR) and a dropped packet rate.

50. The multimedia monitoring system of claim 29, wherein a type and an extent of impairments present in said one or more broadcast networks are identified based on quality of extracted information from said embedded multimedia content.

51. The multimedia monitoring system of claim 29, wherein multiple points of origin of a composite transmission of said embedded multimedia content are differentiated.

52. The multimedia monitoring system of claim 51, wherein said multiple points of origin comprise at least one of:
  (i) a local broadcast segment of a given networked television broadcast,
  (ii) a regional broadcast segment of a given networked television broadcast,
  (iii) a national broadcast segment of a given networked television broadcast,
  (iv) an interstitially inserted advertisement in an Internet stream.

53. The multimedia monitoring system of claim 29, further configured to examine said embedded multimedia content for presence of a valid watermark prior to the transmission of said embedded multimedia content.

54. The system in accordance with claim 53, further configured to ascertain validity of an embedded watermark by verifying identification information obtained from extraction of said watermark against information residing in a database.

55. A system for monitoring broadcast multi-media content, comprising:
  (a) a receiver configured to receive multimedia source content;
  (b) identification information generating means configured to generate identification information related to said multimedia source content;
  (c) an embedder configured to imperceptibly and repeatedly embed an audio component of said multimedia source content with said identification information to produce an embedded multimedia content;
  (d) transfer means configured to transfer said identification information to a central repository;
  (e) a transmitter configured to broadcast said embedded multimedia content through one or more broadcast networks;
  (f) reception means configured to receive said broadcast multimedia content; and
  (g) a processor configured to process said received broadcast multimedia content to extract identification information related thereto, wherein spacing of extracted copies of embedded information is used to estimate boundaries of back-to-back encoded multimedia clips.

* * * * *